United States Patent
Satoh

(10) Patent No.: US 9,519,176 B2
(45) Date of Patent: Dec. 13, 2016

(54) DISPLAY PANEL AND DISPLAY DEVICE

(71) Applicant: SHARP KABUSHIKI KAISHA, Osaka (JP)

(72) Inventor: Eiji Satoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 2 days.

(21) Appl. No.: 14/411,376

(22) PCT Filed: Jun. 14, 2013

(86) PCT No.: PCT/JP2013/066425
§ 371 (c)(1),
(2) Date: Dec. 24, 2014

(87) PCT Pub. No.: WO2014/002788
PCT Pub. Date: Jan. 3, 2014

(65) Prior Publication Data
US 2015/0192807 A1    Jul. 9, 2015

(30) Foreign Application Priority Data
Jun. 27, 2012 (JP) ................. 2012-144721

(51) Int. Cl.
*G02F 1/17* (2006.01)
*G02F 1/1335* (2006.01)
(Continued)

(52) U.S. Cl.
CPC .......... *G02F 1/1335* (2013.01); *G02F 1/1337* (2013.01); *G02F 1/167* (2013.01); *G02F 1/172* (2013.01);
(Continued)

(58) Field of Classification Search
CPC ........ G02F 1/172; G02F 1/167; G02F 1/1337; G02F 1/134309
See application file for complete search history.

(56) References Cited

U.S. PATENT DOCUMENTS 6,700,558 B1 * 3/2004 Itoh ................. G02F 1/134363
345/58
6,829,075 B1    12/2004 Kosc et al.
(Continued)

FOREIGN PATENT DOCUMENTS

| JP | 2-13228 U | 1/1990 |
|---|---|---|
| JP | 04-039630 A | 2/1992 |
| JP | 2010-020003 A | 1/2010 |

OTHER PUBLICATIONS

International Search Report and Written Opinion received for PCT Application No. PCT/JP2013/066425, mailed on Sep. 9, 2013, 7 pages.

*Primary Examiner* — Kendrick Hsu
(74) *Attorney, Agent, or Firm* — Morrison & Foerster LLP

(57) ABSTRACT

Cohesion of shape anisotropy members is prevented
A display panel (2) in accordance with an aspect of the present invention includes: substrates (10) and (20) which are provided so as to face each other; and an optical modulation layer (30) including a plurality of shape anisotropy members (32) each of which includes (i) a core that is an electric conductor and (ii) a covering layer that is a dielectric and that covers an entire periphery of the core. The display panel (2) changes an area of each image of the plurality of shape anisotropy members (32) which image is projected on the substrates (10) and (20), by changing a voltage to be applied to the optical modulation layer (30).

20 Claims, 20 Drawing Sheets

(51) Int. Cl.
  *G02F 1/167* (2006.01)
  *G02F 1/19* (2006.01)
  *G02F 1/1337* (2006.01)

(52) U.S. Cl.
  CPC ..... *G02F 1/19* (2013.01); *G02F 2001/133565* (2013.01)

(56) References Cited

U.S. PATENT DOCUMENTS

| | | | | |
|---|---|---|---|---|
| 2003/0112491 A1* | 6/2003 | Albert | ................... | B25B 13/461 359/296 |
| 2004/0233508 A1 | 11/2004 | Kosc et al. | | |
| 2010/0020271 A1* | 1/2010 | Lin | ...................... | G02F 1/1337 349/75 |

* cited by examiner

FIG. 1
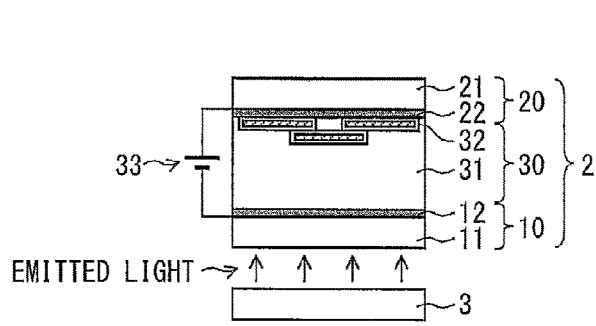
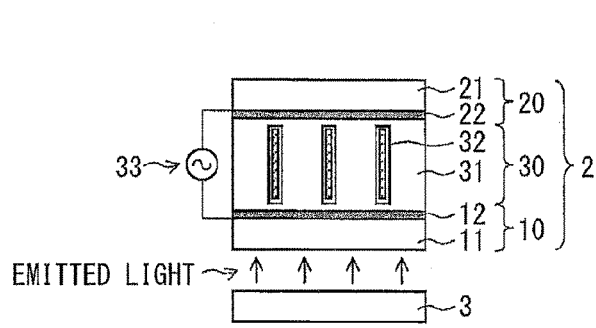
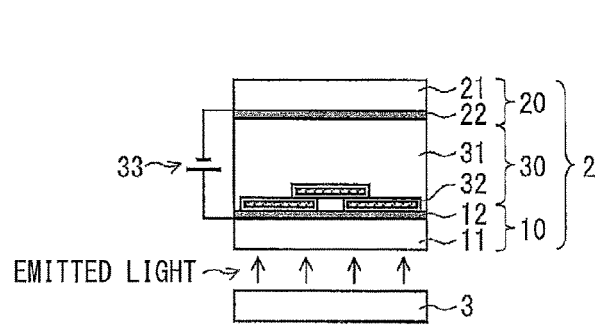

NO COVERING LAYER

COVERING LAYER 0.002 μm

COVERING LAYER 0.04 μm

COVERING LAYER 0.1 μm

COVERING LAYER (SiO$_2$) 0.1 μm

ONLY BOTH SURFACES 6 μm

FIG. 19
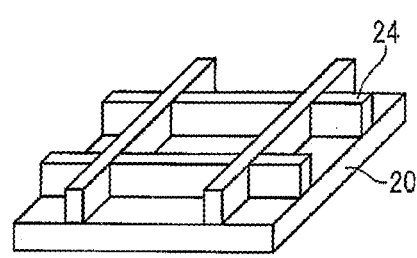
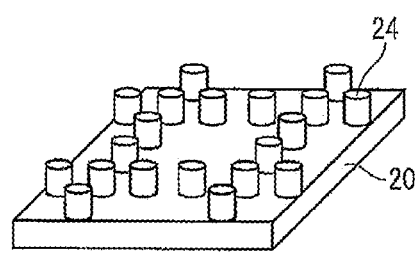

DISPLAY PANEL AND DISPLAY DEVICE

CROSS REFERENCE TO RELATED APPLICATIONS

This is a U.S. National Phase patent application of PCT/JP2013/066425, filed Jun. 14, 2013, which claims priority to Japanese patent application no. 2012-144721, filed Jun. 27, 2012, each of which is hereby incorporated by reference in the present disclosure in its entirety.

TECHNICAL FIELD

The present invention relates to a display panel and a display device.

BACKGROUND ART

A conventional liquid crystal display panel mainly includes a pair of glass substrates, a liquid crystal layer provided between the glass substrates, electrodes provided to the respective glass substrates, and polarizing plates attached to the respective glass substrates. According to such a liquid crystal display panel, light emitted from a backlight passes through the polarizing plates and the liquid crystal layer, and an image is recognized by a contrast appearing on a screen. However, before reaching a display screen, much of the light from the backlight is lost by being absorbed and reflected. This causes a decrease in light use efficiency. In particular, an optical loss occurring in the polarizing plates greatly affects a decrease in light use efficiency.

Patent Literature 1 discloses an optical device which includes flakes suspended in a fluid host and selectively switches optical properties. According to the optical device, orientations of the flakes are changed by a change in electric field to be applied to the fluid host. This causes the optical properties to be switched. According to this configuration, it is possible to omit the polarizing plates and, therefore possible to increase the light use efficiency, as compared with the liquid crystal display panel.

CITATION LIST

Patent Literature 1
The specification of U.S. Pat. No. 6,829,075 (registered on Dec. 7, 2004)

SUMMARY OF INVENTION

Technical Problem

However, in a case where (i) the optical device includes metal flakes as the flakes and (ii) the metal flakes are vertically oriented (that is, oriented so that each long axis of the metal flakes is perpendicular to substrates), such a problem arises that the metal flakes cohere with each other. In a case where the flakes cohere with each other, this can be recognized as display unevenness. Moreover, in a case where the flakes cohere with each other, the flakes cohering with each other can bridge two electrodes sandwiching the fluid host. This can cause leakage between the two electrodes.

The present invention has been made in view of the above problems and, according to an aspect of the present invention, it is possible to prevent cohesion of flakes.

Solution to Problem

A display panel in accordance with the present invention includes first and second substrates which are provided so as to face each other; and an optical modulation layer for controlling a transmittance with respect to light that enters the optical modulation layer, the optical modulation layer being provided between the first and the second substrates and including a plurality of shape anisotropy members, each of the plurality of shape anisotropy members including (i) a core which is an electric conductor and (ii) a covering layer which is a dielectric and which covers an entire periphery of the core, by changing a level or a frequency of a voltage to be applied to the optical modulation layer, an area of each image of the plurality of shape anisotropy members being changed which image is projected on the first and the second substrates.

According to the above configuration, the entire periphery of the core is covered by the covering layer, which is a dielectric. This allows cohesion of the plurality of shape anisotropy members to be suppressed. Therefore, it is possible to suppress display unevenness and improve a display quality. Furthermore, even in a case where the plurality of shape anisotropy members are in contact with an electrode, this does not cause leakage.

The display panel can be arranged such that: the optical modulation layer includes a medium in which the plurality of shape anisotropy members are dispersed; and a difference in refractive index between the medium and the covering layer is not more than 0.3.

The display panel can be arranged such that the covering layer has a thickness of not less than 0.002 μm.

The display panel can be arranged such that the covering layer has a thickness of not less than 0.04 μm.

The display panel can be arranged such that the covering layer has a thickness of not less than 0.1 μm.

The display panel can be arranged such that, assuming that "n" represents a/the refractive index of the covering layer, the covering layer has a thickness of less than 0.19/n[μm].

The display panel can be arranged such that, assuming that "n" represents a/the refractive index of the covering layer, the covering layer has a thickness of more than 0.39/n[μm].

The display panel can be arranged such that the difference in refractive index between the medium and the covering layer is not more than 0.2.

The display panel can be arranged such that at least part of the covering layer is made of silicon dioxide.

The display panel can be arranged such that the core is made of metal and has a reflectivity.

The display panel can be arranged such that: the each of the plurality of shape anisotropy members has an electrostatic property; in a case where the voltage applied to the optical modulation layer is a direct voltage or a voltage having a low frequency of not more than a first threshold, the optical modulation layer blocks light, whereas, in a case where the voltage applied to the optical modulation layer is a voltage having a high frequency of not less than second threshold, the optical modulation layer transmits light; and by changing the frequency of the voltage to be applied to the optical modulation layer, the area of the each image of the plurality of shape anisotropy members is changed which image is projected on the first and the second substrates.

The display panel can be arranged such that: the optical modulation layer contains a polar solvent and a non-polar solvent; the first substrate has a hydrophilic property and is in contact with the polar solvent; the second substrate has a hydrophobic property and is in contact with the non-polar solvent; the each of the plurality of shape anisotropy members has the hydrophilic property or the hydrophobic property; and by changing the level of the voltage to be applied to the optical modulation layer, the area of the each image of the plurality of shape anisotropy members is changed which image is projected on the first and the second substrates.

The display panel can further include an electric field application direction changing circuit for changing a direction of an electric field to be applied to the optical modulation layer, each of the first and the second substrates including an allover electrode, at least one comb-shaped electrode being provided, via an insulating layer, on the allover electrode of the second substrate.

The display panel can be arranged such that: the optical modulation layer contains a liquid crystal material made up of liquid crystal molecules; each surface of the first and second substrates, which surface faces the optical modulation layer, is subjected to alignment treatment; the alignment treatment is carried out so that, while no voltage is being applied to the optical modulation layer, the liquid crystal molecules are aligned so as to be twisted from the first substrate toward the second substrate; and by changing the voltage to be applied to the optical modulation layer so that alignment of the liquid crystal molecules is changed, the area of the each image of the plurality of shape anisotropy members is changed which image is projected on the first and the second substrates.

A display device in accordance with the present invention includes a display panel described above.

Advantageous Effects of Invention

A display panel in accordance with the present invention includes: first and second substrates which are provided so as to face each other; and an optical modulation layer for controlling a transmittance with respect to light that enters the optical modulation layer, the optical modulation layer being provided between the first and the second substrates and including a plurality of shape anisotropy members, each of the plurality of shape anisotropy members including (i) a core which is an electric conductor and (ii) a covering layer which is a dielectric and which covers an entire periphery of the core, by changing a level or a frequency of a voltage to be applied to the optical modulation layer, an area of each image of the plurality of shape anisotropy members being changed which image is projected on the first and the second substrates.

This allows cohesion of the plurality of shape anisotropy members to be suppressed. Therefore, it is possible to suppress display unevenness and improve a display quality. Furthermore, even in a case where the plurality of shape anisotropy members are in contact with an electrode, this does not cause leakage.

BRIEF DESCRIPTION OF DRAWINGS

FIG. 1 is a cross-sectional view schematically illustrating a configuration of a display device in accordance with an embodiment of the present invention.

Figure 2:
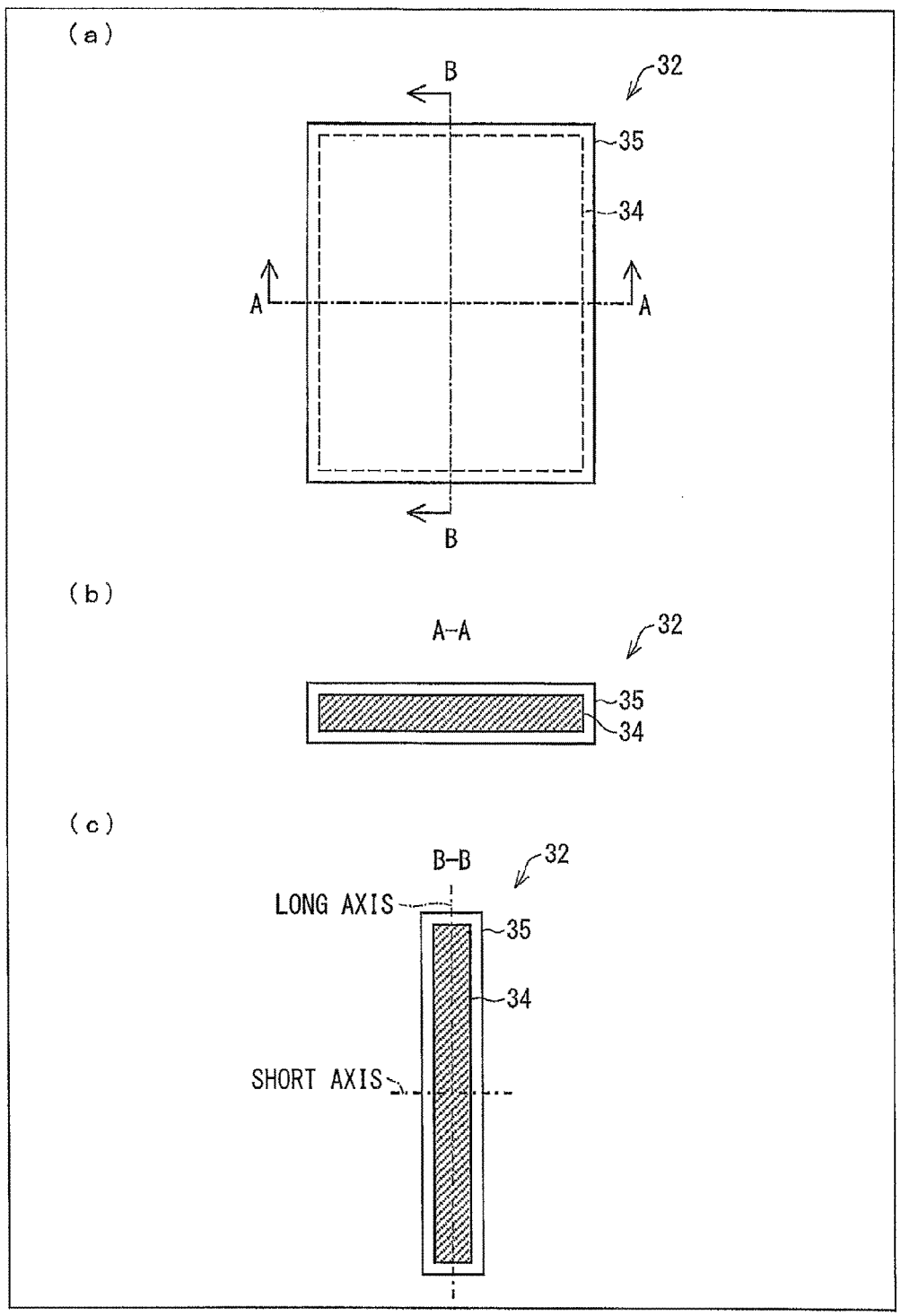

(a) of FIG. 2 is a plan view illustrating a configuration of a shape anisotropy member. (b) of FIG. 2 is a cross-sectional view taken along a line A-A. (c) of FIG. 2 is a cross-sectional view taken along a line B-B.

Figure 3:
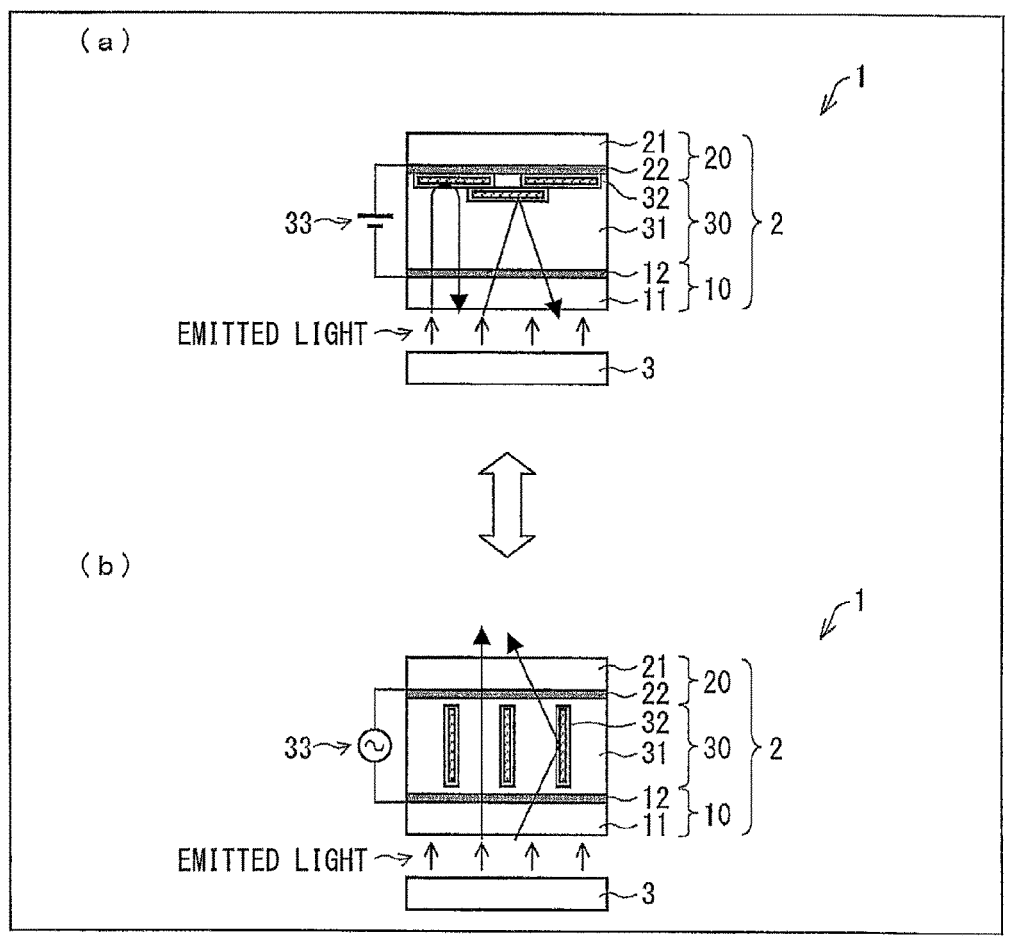

(a) of FIG. 3 is a view illustrating how light travels in the display device illustrated in (a) of FIG. 1. (b) of FIG. 3 is a view illustrating how light travels in the display device illustrated in (b) of FIG. 1.

Figure 4:
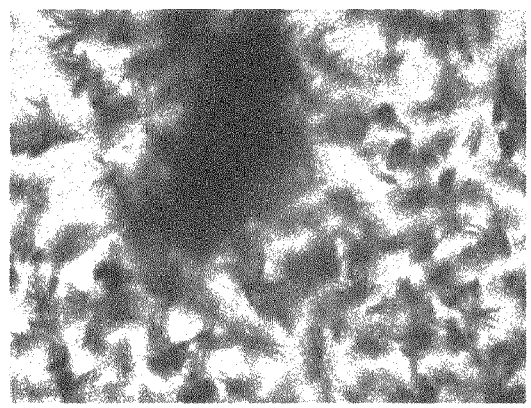

FIG. 4 is an image obtained by capturing, with the use of a microscope, a state where flakes of a comparative example were vertically oriented (plan view).

Figure 5:
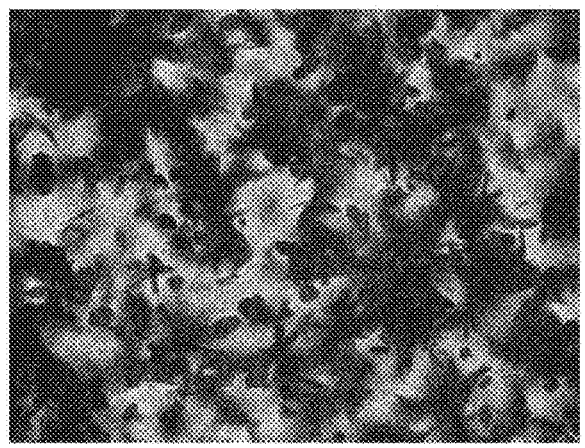

FIG. 5 is an image obtained by capturing, with the use of a microscope, a state where flakes of an example of the present invention were vertically oriented (plan view).

Figure 6:
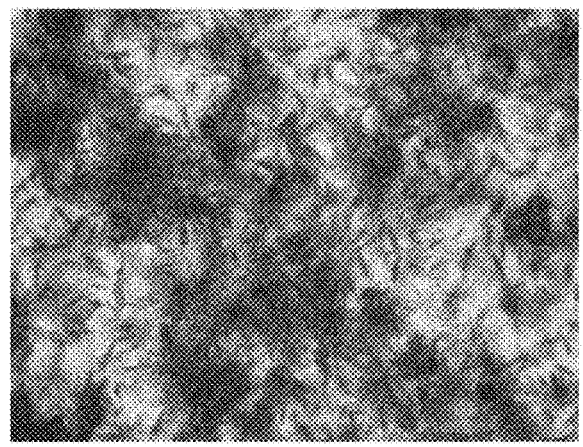

FIG. 6 is an image obtained by capturing, with the use of a microscope, a state where flakes of another example of the present invention were vertically oriented (plan view).

Figure 7:
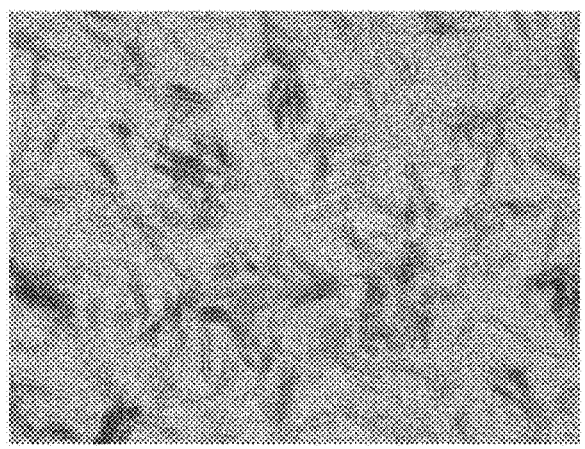

FIG. 7 is an image obtained by capturing, with the use of a microscope, a state where flakes of further another example of the present invention were vertically oriented (plan view).

Figure 8:

FIG. 8 is an image obtained by capturing, with the use of a microscope, a state where flakes of still further another example of the present invention were vertically oriented (plan view).

Figure 9:
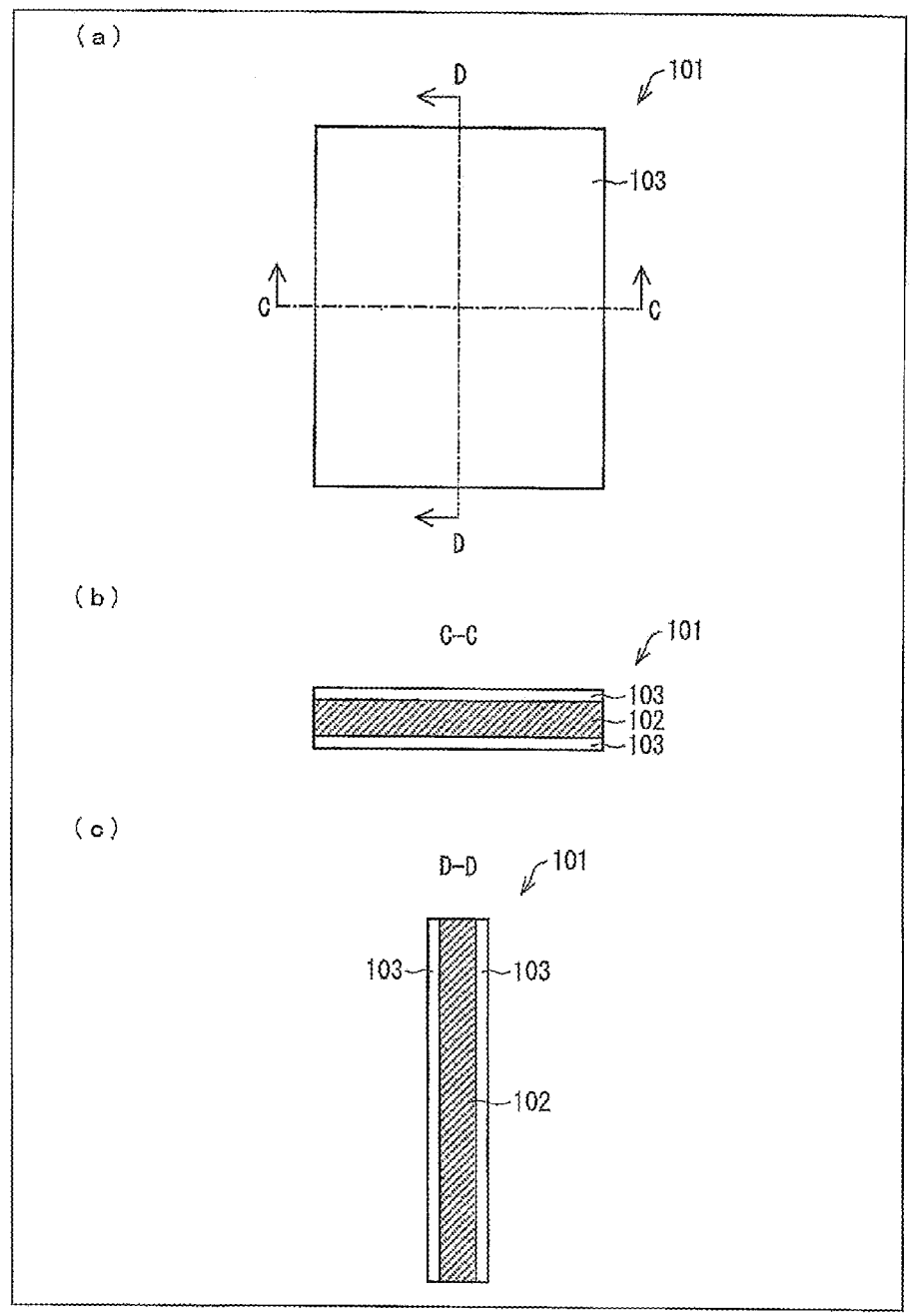

(a) of FIG. 9 is a plan view schematically illustrating a configuration of a flake of a comparative example. (b) of FIG. 9 is a cross-sectional view taken along a line C-C. (c) of FIG. 9 is a cross-sectional view taken along a line D-D.

Figure 10:
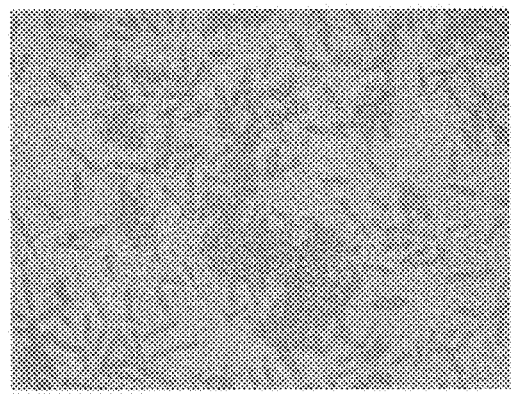

FIG. 10 is an image obtained by capturing, with the use of a microscope, a state where flakes of the comparative example were vertically oriented (plan view).

Figure 11:
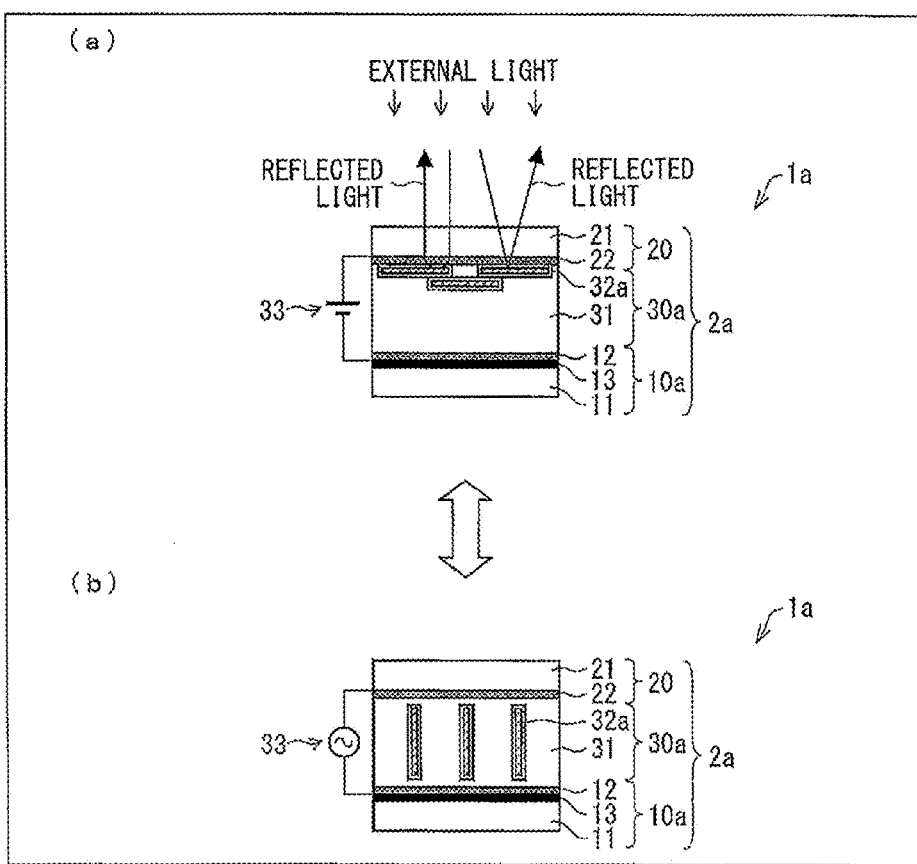

FIG. 11 is a cross-sectional view schematically illustrating a configuration of a reflective display device in accordance with the embodiment of the present invention.

Figure 12:
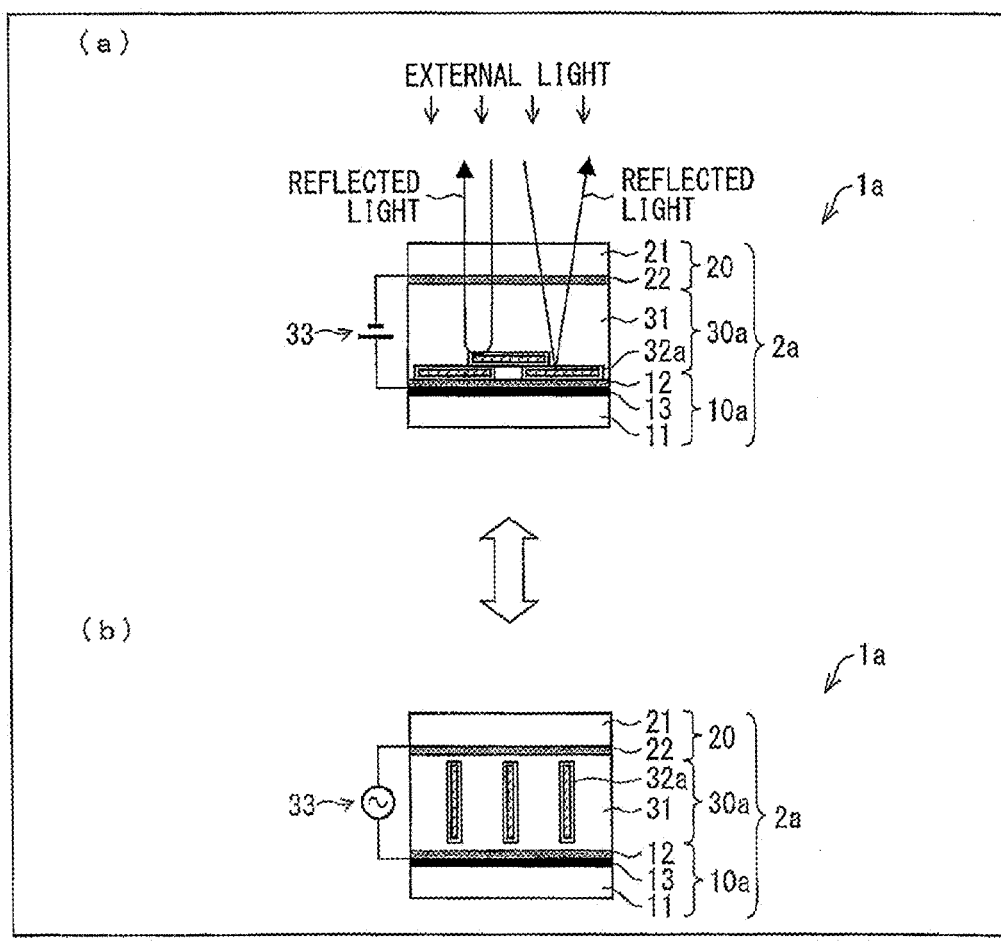

FIG. 12 is a cross-sectional view schematically illustrating the configuration of the reflective display device in accordance with the embodiment of the present invention.

Figure 13:
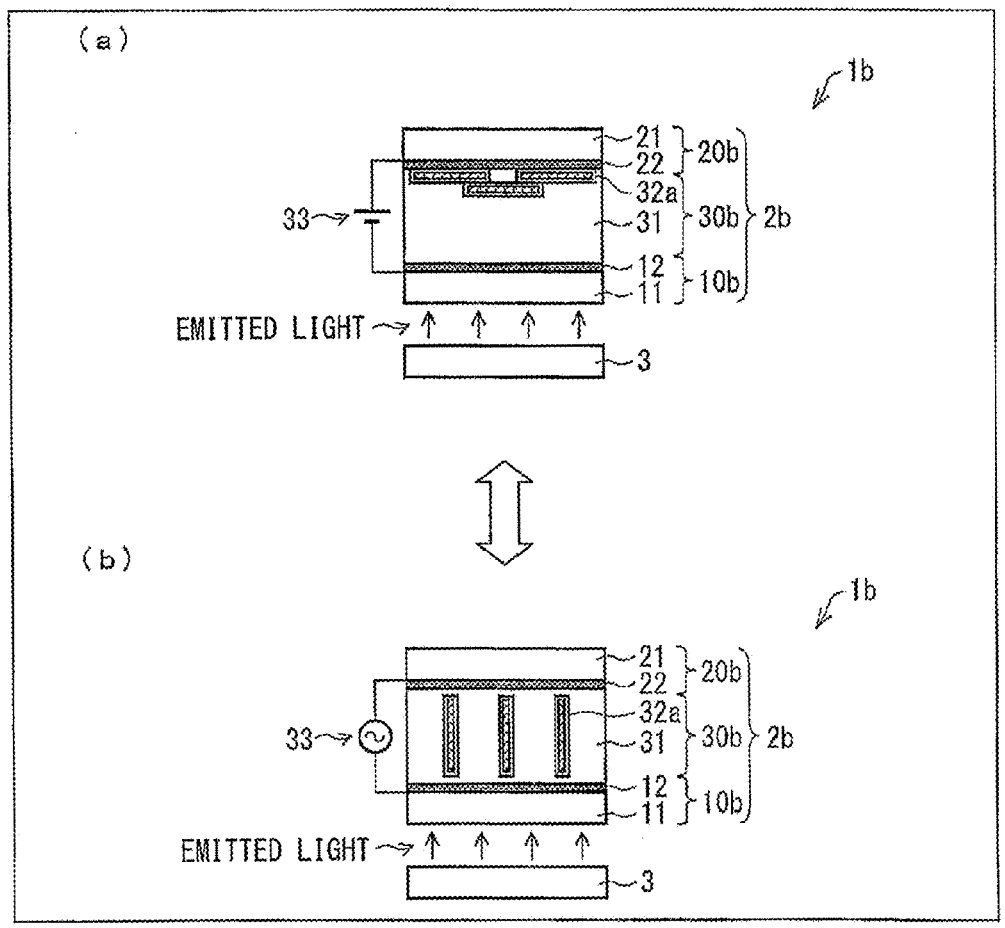

FIG. 13 is a cross-sectional view schematically illustrating a configuration of a transflective display device in accordance with the embodiment of the present invention.

Figure 14:
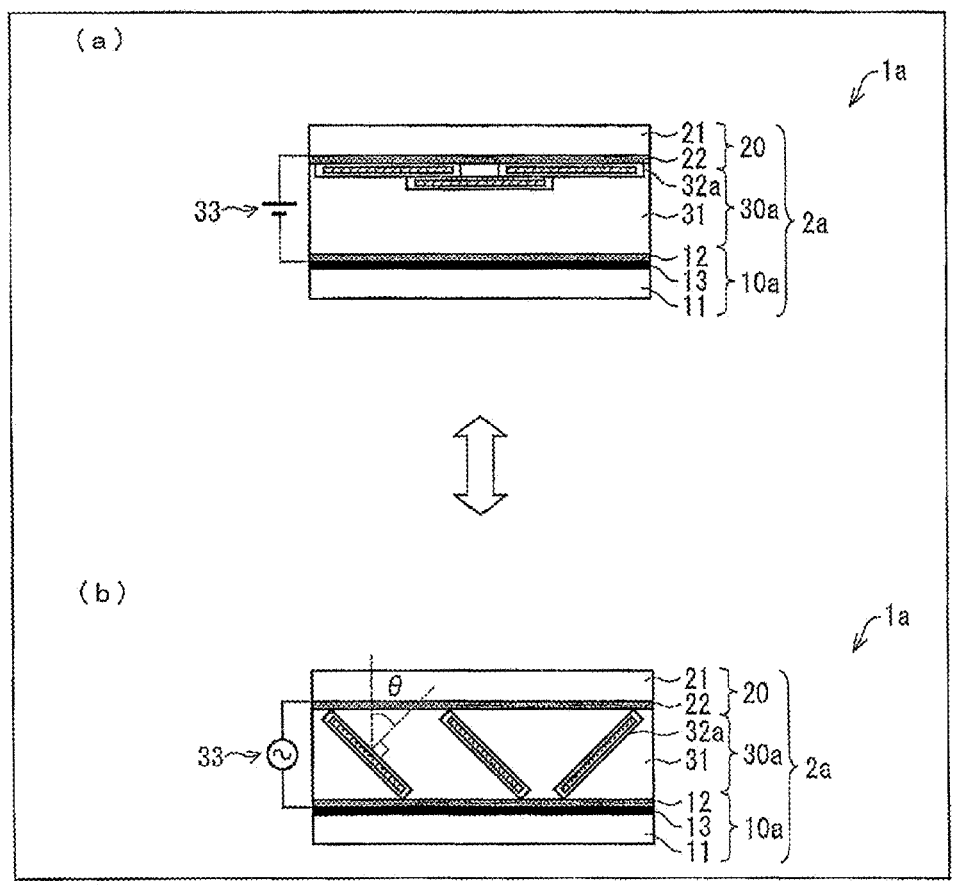

FIG. 14 is a cross-sectional view schematically illustrating the configuration of the reflective display device in accordance with the embodiment of the present invention.

Figure 15:
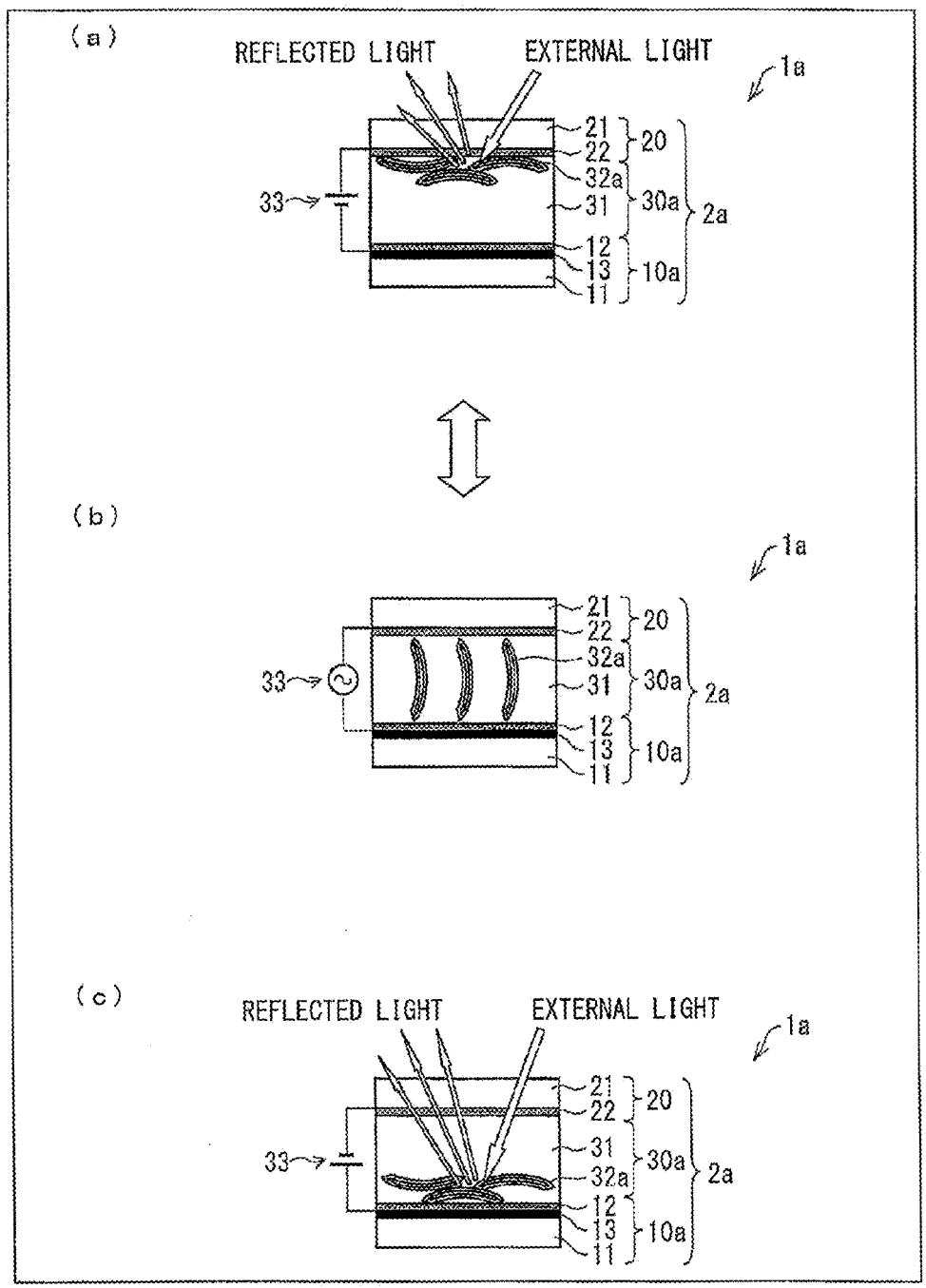

FIG. 15 is a cross-sectional view schematically illustrating the configuration of the reflective display device in accordance with the embodiment of the present invention.

Figure 16:
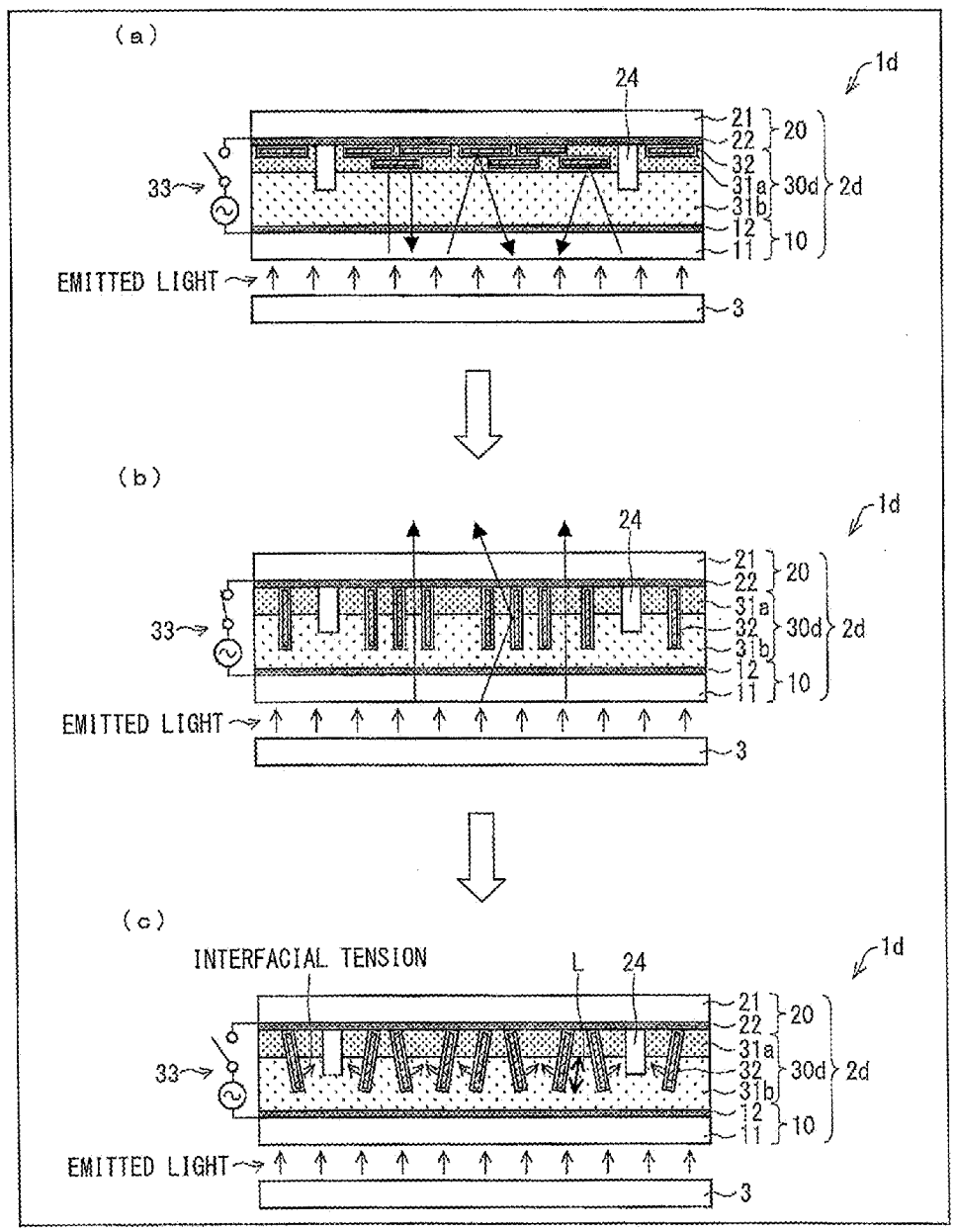

FIG. 16 is a cross-sectional view schematically illustrating a configuration of a display device in accordance with another embodiment of the present invention.

Figure 17:
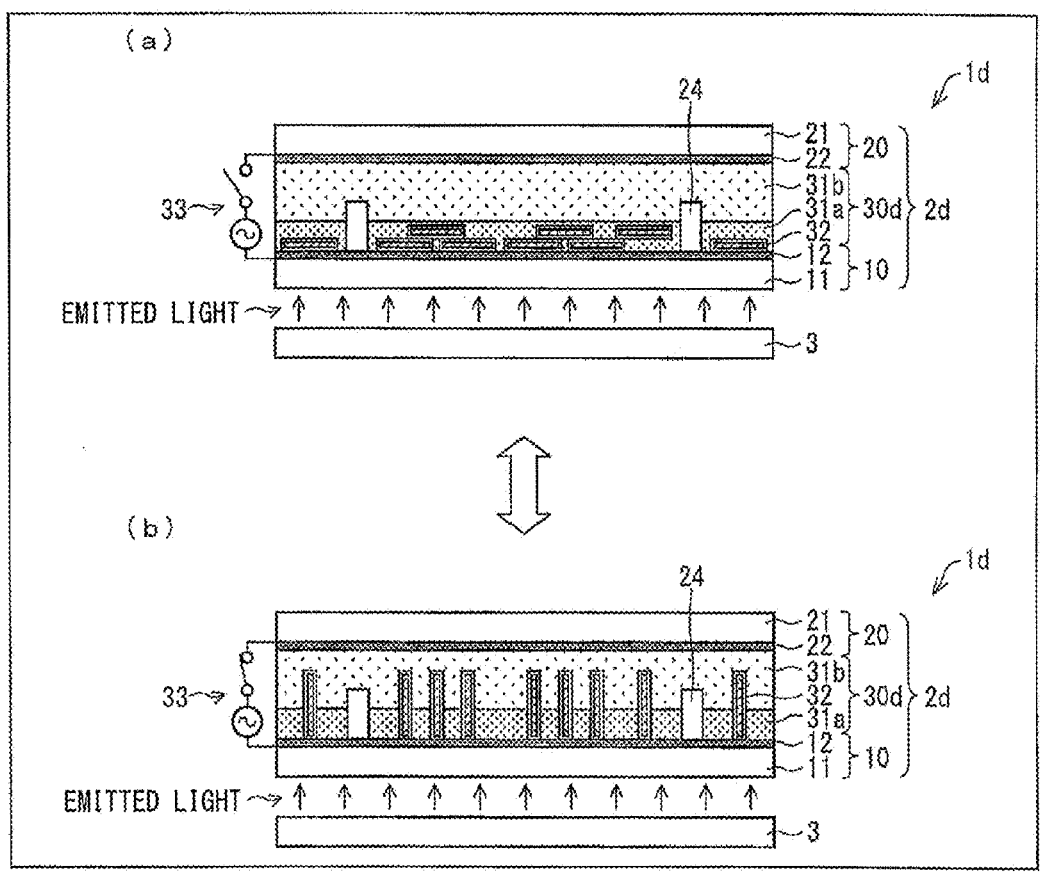

FIG. 17 is a cross-sectional view schematically illustrating a configuration of a display device in accordance with the another embodiment of the present invention.

Figure 18:
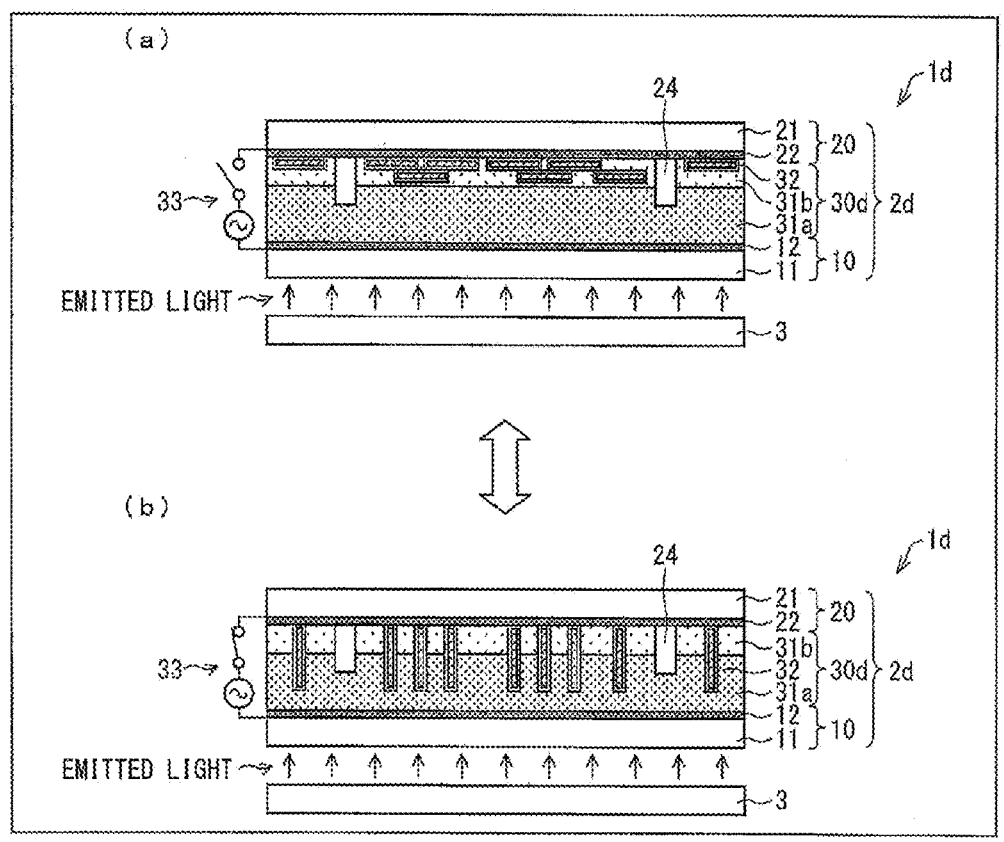

FIG. 18 is a cross-sectional view schematically illustrating a configuration of a display device in accordance with the another embodiment of the present invention.

(a) of FIG. 19 is a perspective view illustrating a lattice-shaped rib. (b) of FIG. 19 is a perspective view illustrating ribs arranged in a pattern of islands.

Figure 20:
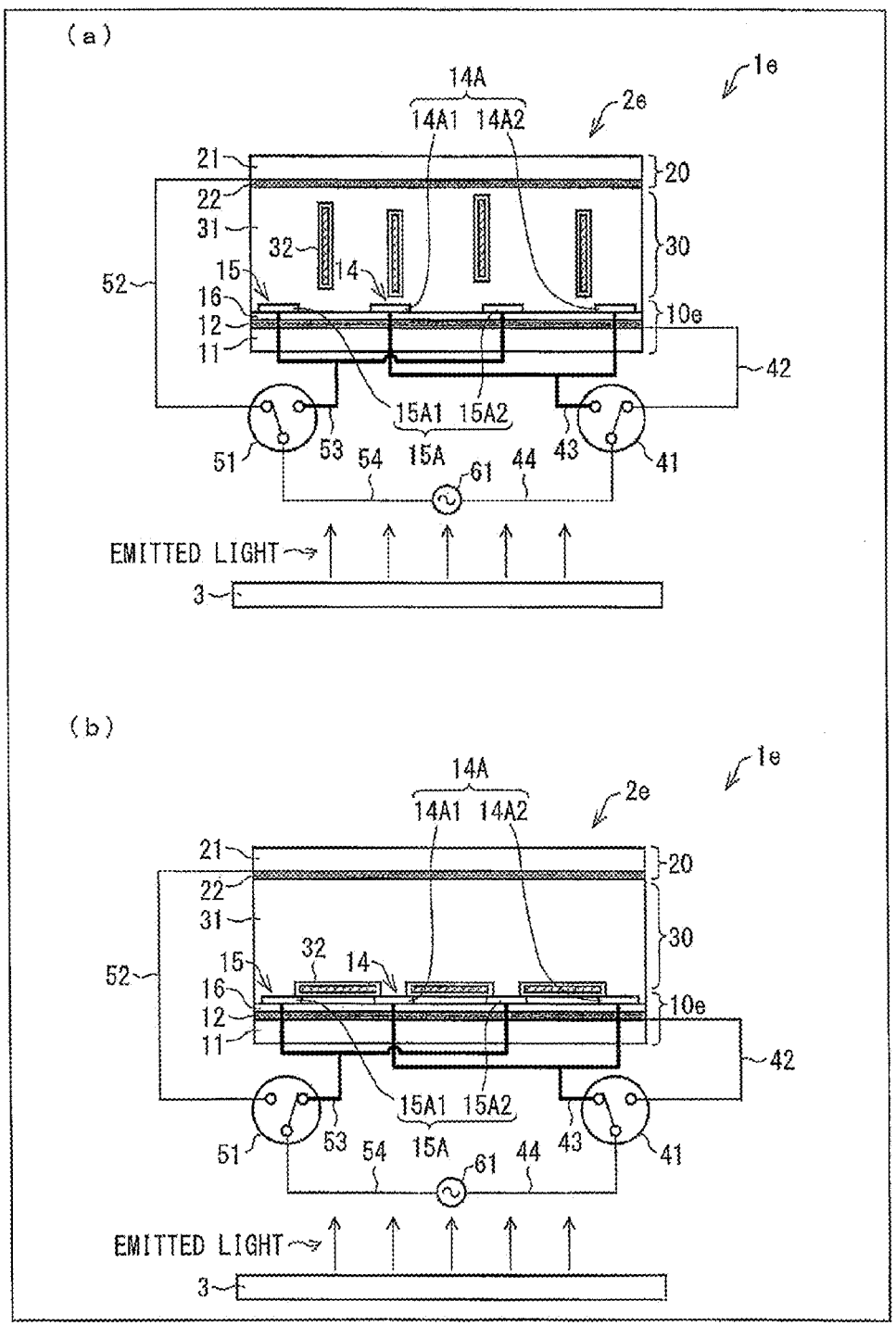

FIG. 20 is a cross-sectional view schematically illustrating a configuration of a display device in accordance with further another embodiment of the present invention.

Figure 21:
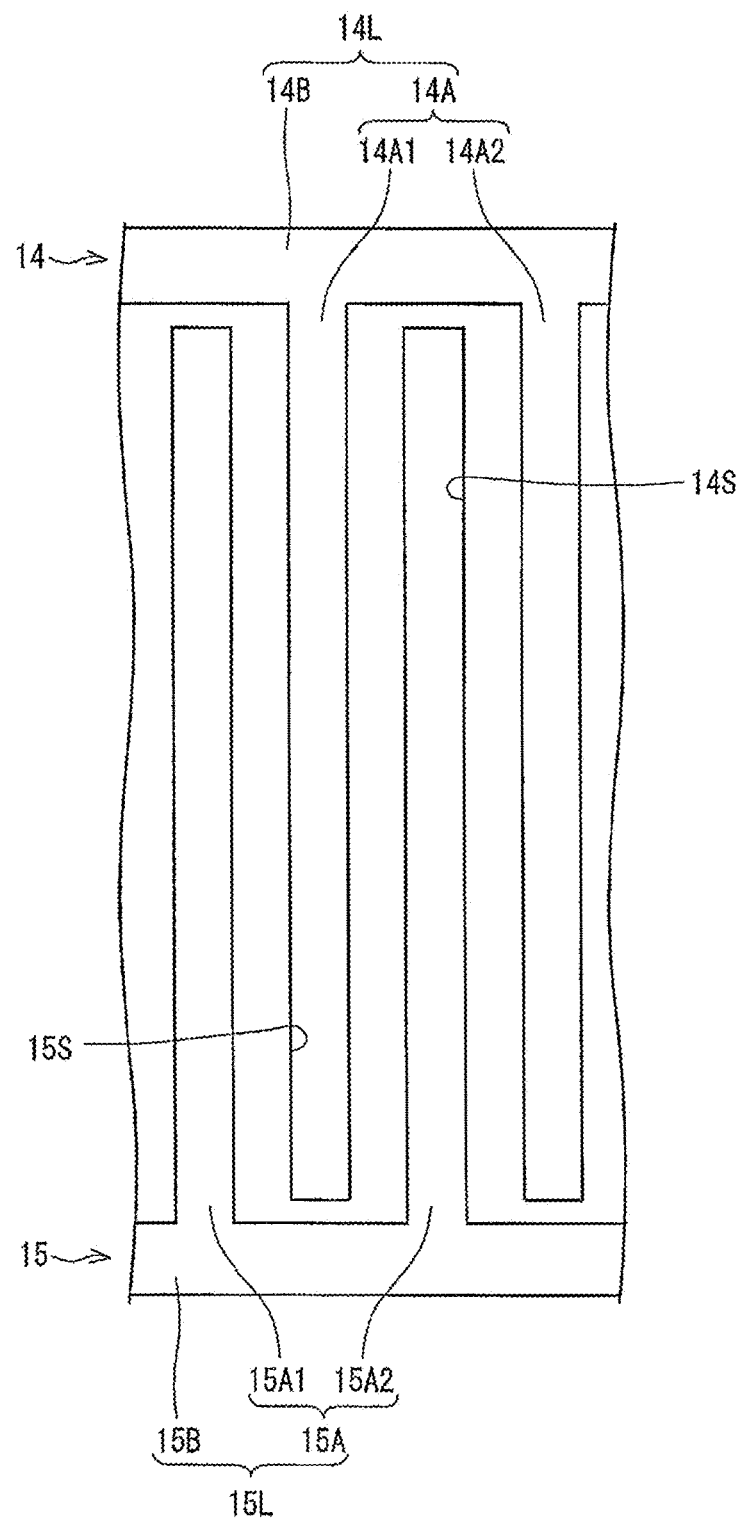

FIG. 21 is a plan view of a substrate which view schematically illustrates a configuration of comb-shaped electrodes.

Figure 22:
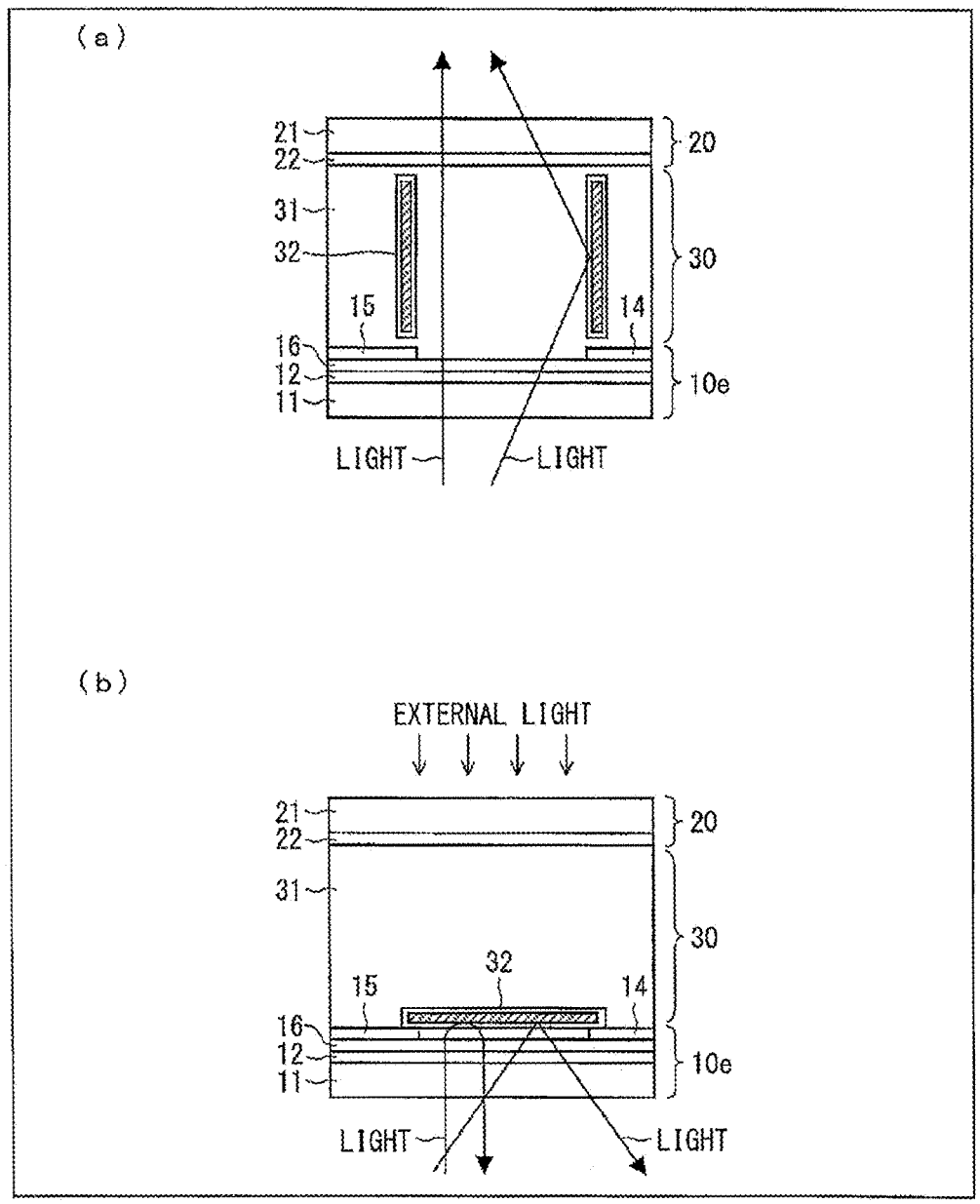

(a) of FIG. 22 is a cross-sectional view of a main part of a display panel illustrated in (a) of FIG. 20, which view illustrates how light travels. (b) of FIG. 22 is a cross-sectional view of a main part of the display panel illustrated in (b) of FIG. 20, which view illustrates how light travels.

Figure 23:
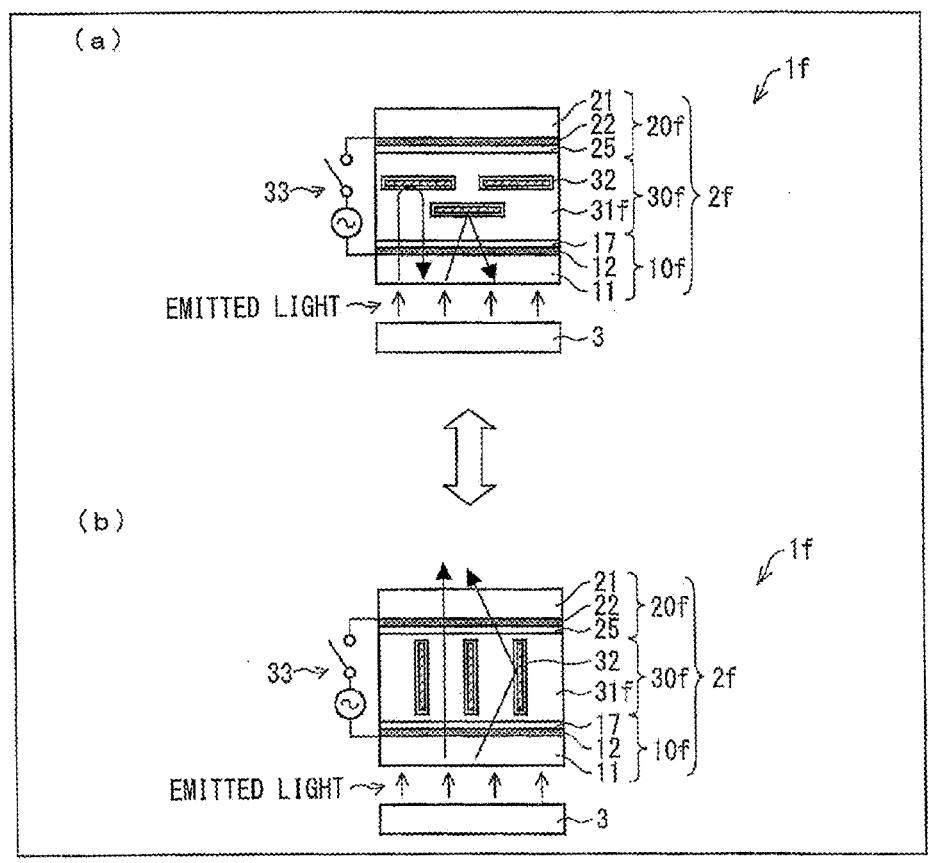

FIG. 23 is a cross-sectional view schematically illustrating a configuration of a display device in accordance further another embodiment of the present invention.

Figure 24:
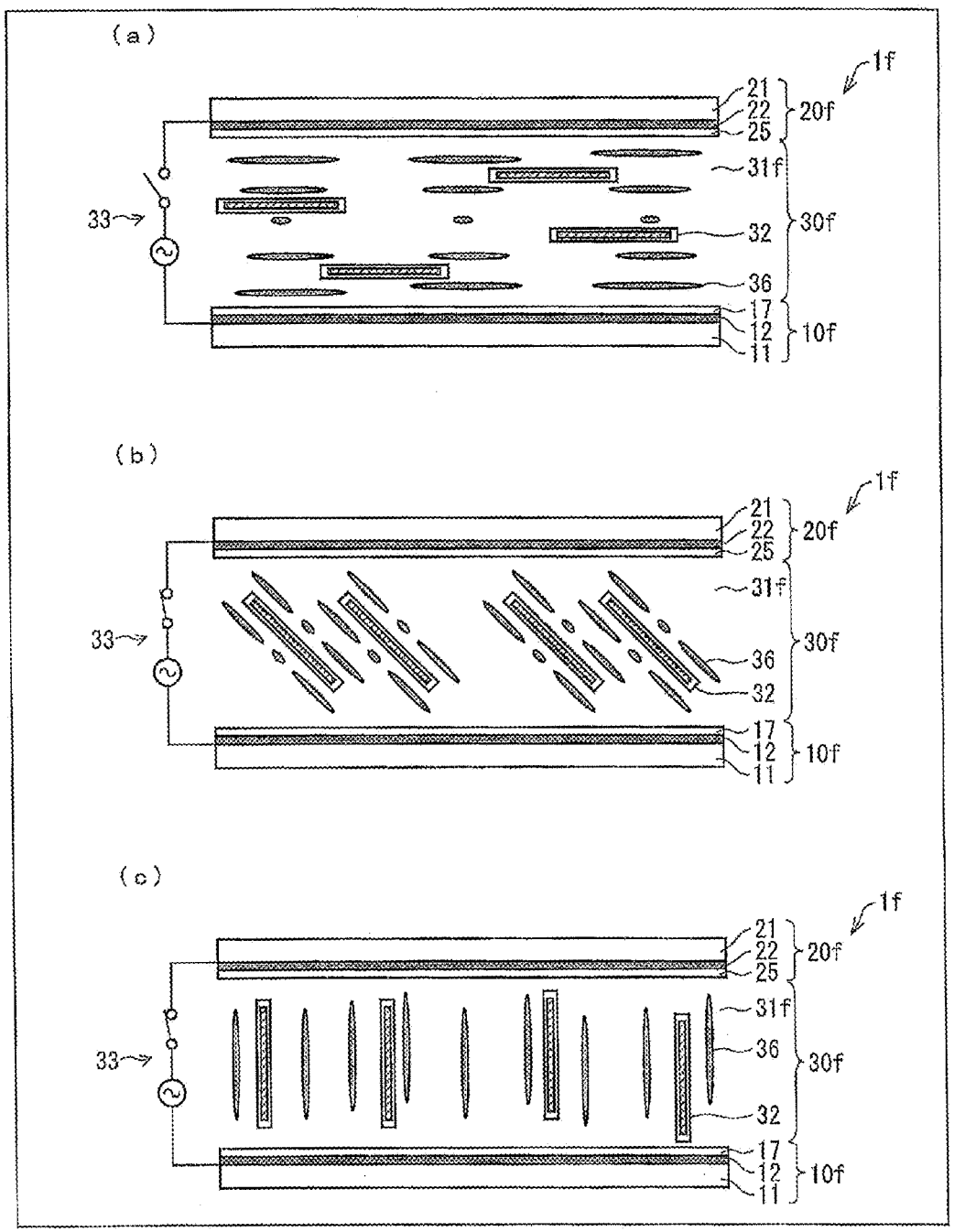

FIG. 24 is a cross-sectional view of a display panel which view illustrates how (i) flakes serving as shape anisotropy members and (ii) liquid crystal molecules which are part of a liquid crystal material are aligned.

DESCRIPTION OF EMBODIMENTS

The following description will discuss, in detail, embodiments of the present invention with reference to the drawings.

[Embodiment 1]

(Configuration of Display Device)

(a) through (c) of FIG. 1 are cross-sectional views each schematically illustrating a configuration of a display device 1 in accordance with Embodiment 1. The display device 1 includes a display panel 2, a backlight 3 which irradiates the display panel 2 with light, and driving circuits (not illustrated). The display device 1 is a transmissive display device which carries out display by causing the display panel 2 to transmit light emitted from the backlight 3.

Note that the backlight 3 is identical in configuration to a conventional backlight. Therefore, the configuration of the backlight 3 will not be described here. As the backlight 3, an edge-light type surface light source device, a direct surface light source device, or the like can be employed as appropriate. As a light source of the backlight 3, a fluorescent tube, an LED, or the like can be employed as appropriate.

The display panel 2 includes (i) a pair of substrates 10 and 20 which are provided so as to face each other and (ii) an optical modulation layer 30 which is provided between the pair of substrates 10 and 20. The substrate 10 (first substrate) is provided on a backlight 3 side (back surface side), and the substrate 20 (second substrate) is provided on a display surface side (viewer side). Further, the display panel 2 has a plurality of pixels arranged in a matrix manner.

The substrate 10 includes (i) an insulating substrate made up of, for example, a transparent glass substrate and (ii) electrodes 12 (first electrodes). The substrate 20 includes (i) an insulating substrate made up of, for example, a transparent glass substrate and (ii) an electrode 22 (second electrode).

The substrate 10 constitutes an active matrix substrate. Specifically, the substrate 10 includes a glass substrate (insulating substrate) 11 on which various signal lines (such as scanning signal lines and data signal lines) (not illustrated), thin film transistors (TFTs) (not illustrated), and an insulating film (not illustrated) are provided. The electrodes 12 (pixel electrodes) are provided on those members. The driving circuits (such as a scanning signal line driving circuit and a data signal line driving circuit) which drive the various signal lines are identical in configuration to conventional driving circuits.

The substrate 20 includes a glass substrate 21 on which the electrode 22 (common electrode) is provided.

The electrodes 12, which are provided in the substrate 10, and the electrode 22, which is provided in the substrate 20, are each made up of a transparent and electrically conductive film made of ITO (Indium Tin Oxide, IZO (Indium Zinc Oxide), zinc oxide, tin oxide, or the like. Note that the electrodes 12 are provided so as to correspond to the respective plurality of pixels, and the electrode 22 is provided allover so as to be common to all of the plurality of pixels. Note also that, similar to the electrodes 12, electrodes 22 can be alternatively provided so as to correspond to the respective plurality of pixels.

(Configuration of Optical Modulation Layer)

The optical modulation layer 30 is provided between the electrodes 12 and the electrode 22, and includes a medium 31 and a plurality of shape anisotropy members 32 contained in the medium 31. The optical modulation layer 30 is configured such that a voltage is applied to the optical modulation layer 30 by a power supply 33 connected to the electrodes 12 and the electrode 22. Depending on a change in frequency of such an applied voltage, the optical modulation layer 30 changes its transmittance with respect to light that enters the optical modulation layer 30 from the backlight 3. Note here that an alternating voltage having a frequency of 0 (zero) Hz is herein referred to as a "direct voltage". A thickness (cell thickness) of the optical modulation layer 30 is set depending on a length, in a long axis direction, of each of the plurality of shape anisotropy members 32. For example, the thickness of the optical modulation layer 30 is set to 80 µm.

FIG. 2 is a view illustrating a configuration of a shape anisotropy member 32. (a) of FIG. 2 is a plan view illustrating the configuration of the shape anisotropy member 32. (b) of FIG. 2 is a cross-sectional view taken along a line A-A. (c) of FIG. 2 is a cross-sectional view taken along a line B-B. The shape anisotropy member 32 includes a core 34 and a covering layer 35. The shape anisotropy member 32 is formed so as to be long along its long axis and short along its short axis. Note that, in Embodiment 1, a rectangular plate-shaped flake is employed as the shape anisotropy member, but a disc-shaped flake can be alternatively employed.

The core 34 is a flake (thin plate)-shaped electric conductor made of, for example, metal. The core 34 has a light reflectivity and/or a light blocking effect. Note that a shape of the core 34 is not limited to a flake shape, but can be alternatively a cylindrical shape or an oval-spherical shape. As the core 34, an aluminum flake which is generally used for painting can be employed. For example, an aluminum flake whose length in a long axis direction (major axis) is 20 µm and length in a short axis direction (minor axis) is 0.3 µm can be employed as the core 34.

The covering layer 35 is a dielectric layer covering an entire periphery (all of surfaces) of the core 34. As illustrated in (a) through (c) of FIG. 2, the covering layer 35 covers the entire periphery (a front surface, a back surface, a left side surface, a right side surface, a upper surface, and a lower surface) of the core 34. In Embodiment 1, the covering layer 35 has a light-transmitting property. Note that the covering layer 35 can be colored so as to absorb visible light in a specific range. Note also that the covering layer 35 can be alternatively configured to absorb visible light (the covering layer 35 is colored back) and transmit light (such as an infrared ray and an ultraviolet ray) other than the visible light.

Examples of a material of the covering layer 35 encompass: organic materials such as acrylic resin, polyimide resin, and polyester resin; and inorganic materials such as silicon dioxide, silicon nitride, and alumina. In a case where a covering layer 35 made of an organic material is formed on the periphery of the core 34, it is possible to form an acrylic polymer on the periphery of the core by, for example, (i) dispersing the core in an acrylic monomer solution and (ii) irradiating the acrylic monomer solution, in which the core is dispersed, with an ultraviolet ray. In a case where a covering layer 35 made of an inorganic material is formed on the periphery of the core 34, it is possible to form silicon dioxide on the periphery of the core by use of a known sol-gel process. Note that the covering layer 35 can be alternatively made of a plurality of materials, and part of the covering layer 35 can be made of silicon dioxide.

The shape anisotropy member 32 is a responsive member which rotates depending on a direction of an electric field.

In terms of a display characteristic, the shape anisotropy member 32 is such a member that an area of a projected image of the shape anisotropy member 32 which projected image is viewed from a direction normal to the substrates 10 and 20 (an area of an image projected on each of the substrates 10 and 20) varies depending on a change in frequency of an applied voltage. A projected area ratio (ratio of a maximum projected area to a minimum projected area) is preferably not less than 2:1. That is, an area of a cross section ((a) of FIG. 2) perpendicular to the short axis of the shape anisotropy member 32 is preferably twice as large as that of a cross section ((b) of FIG. 2) perpendicular to the long axis of the shape anisotropy member 32.

Further, the shape anisotropy member 32 is a member having a positive or negative electrostatic property in the medium 31. That is, the shape anisotropy member 32 is electrically charged in the medium 31. Specifically, as the shape anisotropy member 32, a member capable of giving and receiving electrons to/from an electrode, a medium, or the like can be employed.

Note that a shape of the shape anisotropy member 32 is not limited to a flake shape, but can be alternatively a cylindrical shape or an oval-spherical shape.

Note also that a specific gravity of the shape anisotropy member 32 is preferably not more than 11 g/cm$^3$, more preferably not more than 3 g/cm$^3$, even more preferably equivalent to that of the medium 31. This is because, in a case where the specific gravity of the shape anisotropy member 32 is greatly different from that of the medium 31, a problem arises that the shape anisotropy member 32 sediments or floats. In a case where a material having a low specific gravity, such as resin, is employed as the covering layer 35, it is possible to adjust (lower) the specific gravity of the shape anisotropy member 32 by adjusting (thicken) a film thickness of the covering layer 35.

The medium 31 is a material having a light-transmitting property with respect to light in a visible light region. As the medium 31, a liquid which hardly absorbs light in the visible light region or a liquid which hardly absorbs light in the visible light region and is colored with the use of a pigment can be, for example, employed. The specific gravity of the medium 31 is preferably equivalent to that of the shape anisotropy member 32. The medium 31 is an insulator.

Further, the medium 31 is preferably low in volatileness, in view of a process of sealing the medium 31 inside a cell. A viscosity of the medium 31 relates to responsiveness, and is preferably not more than 5 mPa·s, more preferably not less than 0.5 mPa·s in order that sedimentation of the shape anisotropy member 32 is prevented.

The medium 31 can be made of a single substance or can be alternatively made of a mixture of a plurality of substances. For example, the medium 31 can be made of propylene carbonate, NMP (N-methyl-2-pyrrolidone), fluorocarbon, silicone oil, and/or the like.

External light or light from the backlight 3 is reflected by the shape anisotropy member. Light reflected by the shape anisotropy member 32 includes light reflected by a surface of the core 34 and light reflected by an interface between the medium 31 and the covering layer 35 (a surface of the covering layer 35). A difference in refractive index between the medium 31 and the covering layer 35, which is a dielectric, is preferably not more than 0.3, more preferably not more than 0.2. By setting the difference in refractive index between the medium 31 and the covering layer 35 to not more than 0.3, it is possible to suppress, to approximately not more than 1 (one) %, a reflectance of the interface between the medium 31 and the covering layer 35. Since the light reflected by the interface between the medium 31 and the covering layer 35 is thus low in intensity, interference of the light reflected by the interface with the light reflected by the surface of the core 34 is small. This makes it possible to prevent a case where light reflected by the shape anisotropy member 32 looks colored because part of the light which part has a specific wavelength is intensified due to the interference. That is, according to the display device 1, it is possible to display a desired color, regardless of an angle at which the display device 1 is viewed.

For example, in a case where (i) NMP (N-methyl-2-pyrrolidone) having a refractive index of 1.48 is employed as the medium 31 and (ii) silicon dioxide having a refractive index of 1.45 is employed as the dielectric making up the covering layer 35, it is possible to control the reflectance of the interface between the medium 31 and the covering layer 35 to be approximately not more than 0.01%.

Furthermore, it is possible to reduce the interference by adjusting the film thickness of the covering layer 35. Visible light has wavelengths between approximately not less than 380 nm and not more than 780 nm. Therefore, it is only necessary to set the film thickness of the covering layer 35 so that light having a wavelength in such a range do not strongly interfere with other light having a wavelength in the range. Here, assuming that "$\lambda$" represents a wavelength of light, "n" represents the refractive index of the covering layer 35 (dielectric), and "d" represents the film thickness of the covering layer 35, $$2d = \lambda/n \quad (1)$$

In a case where (i) the above expression (1) is satisfied and (ii) light is emitted toward the shape anisotropy member 32 from a direction normal to a surface of the shape anisotropy member 32, light reflected by the surface of the covering layer 35 interferes with light reflected by the surface of the core 34 in such a way that each light is intensified. That is, part of reflected light which part has a specific wavelength is intensified by first-order interference, so that the reflected light looks colored.

In order to cause interfered visible light (having wavelengths between 380 nm and 780 nm) due to first-order interference not to appear in the reflected light, it is only necessary to set the thickness "d" of the covering layer 35 so as not to satisfy the expression (1). That is, in a case where the thickness "d" is less than 0.19/n[μm] or more than 0.39/n[μm], it is possible to prevent a case where the reflected light looks colored. For example, in a case where silicon dioxide having a refractive index of 1.45 is employed as the dielectric making up the covering layer 35, the thickness "d" of the covering layer 35 is preferably less than 0.13 μm or more than 0.27 μm.

A minor axis (thickness) of the shape anisotropy member 32 is preferably not more than half of a major axis of the shape anisotropy member 32. Therefore, even in a case where a thickness of the core 34 is, for example, almost 0 (zero), the thickness on one side of the covering layer 35 is preferably not more than half of the major axis of the shape anisotropy member 32 so that the minor axis (thickness) of the shape anisotropy member 32 is not more than half of the major axis of the shape anisotropy member 32. Assuming that "x" represents the thickness of the core 34 and "y" represents a major axis of the core 34, the thickness "d" of the covering layer 35 is preferably not more than (y−2x)/2.

(How to Control Transmittance)

Next, how the optical modulation layer 30 controls its transmittance with respect to light will be described below in detail. Note that a case will be described here where flake-shaped shape anisotropy members 32 (referred to as flakes) as illustrated in FIG. 2 are employed.

In a case where a voltage (alternating voltage) having a high frequency, e.g., a frequency of 60 Hz, is applied to the optical modulation layer 30, the flakes rotate so that each long axis of the flakes is in parallel to an electric flux line (see (b) of FIG. 3), due to a force explained from the viewpoint of a dielectrophoretic phenomenon, the Coulomb force, or electric energy. That is, the flakes are oriented (hereinafter, referred to as vertically oriented) so that the each long axis of the flakes is perpendicular to the substrates 10 and 20. This causes light that enters the optical modulation layer 30 from the backlight 3 to be transmitted by (passes through) the optical modulation layer 30 and then exit to the viewer side. As each of the shape anisotropy members 32 becomes thinner, the transmittance becomes higher.

On the other hand, in a case where a voltage having a low frequency, e.g., a frequency of 0.1 Hz, or a direct voltage (having a frequency of 0 (zero) Hz) is applied to the optical modulation layer 30, the flakes, each of which has an electrostatic property, are drawn to a vicinity of one of the electrodes which one is charged with an electric charge having a polarity opposite to that of an electric charge with which each of the flakes is charged, due to a force explained by a dielectrophoretic force or the Coulomb force. The flakes are then most stably oriented, so that the flakes rotate so as to adhere to the substrate 10 or 20. (a) of FIG. 3 illustrates an example state where, in a case where (i) a direct voltage is applied to the optical modulation layer 30 and (ii) a polarity (positive) of an electric charge, with which the electrode 22 of the substrate 20 is charged, is different from a polarity (negative) of an electric charge with which each of the flakes is charged, the flakes are oriented so as to adhere to the substrate 20. That is, the flakes are oriented (hereinafter, referred to as horizontally oriented) so that the each long axis of the flakes is in parallel to the substrates 10 and 20. In this case, each short axis of the flakes is perpendicular to the substrates 10 and 20. This causes light that enters the optical modulation layer 30 from the backlight 3 to be blocked by the flakes, so that the light is not transmitted by (does not pass through) the optical modulation layer 30. As each of the shape anisotropy members 32 becomes thinner, unevenness, on the display side, of the shape anisotropy members becomes smaller when the shape anisotropy members are layered. This allows a reduction in scattering of external light.

By thus switching a voltage to be applied to the optical modulation layer 30 between a direct voltage having a frequency of 0 (zero) Hz and an alternating voltage or between a voltage having a low frequency and a voltage having a high frequency, it is possible to change the transmittance with respect to light (amount of transmitted light) that enters the optical modulation layer 30 from the backlight 3. Note that, in a case where the flakes are horizontally oriented (orientation of the flakes is switched to horizontal orientation), a voltage has a frequency in a range of, for example, 0 (zero) Hz to 0.5 Hz. In a case where the flakes are vertically oriented (the orientation of the flakes is switched to vertical orientation), a voltage has a frequency in a range of, for example, 30 Hz to 1 (one) kHz. Frequencies in such numeral ranges are set in advance depending on a shape and a material of each of the flakes (shape anisotropy members 32), the thickness (cell thickness) of the optical modulation layer 30, and/or the like. That is, the display device 1 is configured such that the transmittance with respect to light (amount of transmitted light) is changed by switching a frequency of a voltage to be applied to the optical modulation layer 30 between (i) a voltage having a low frequency of not more than a first threshold and (ii) a voltage having a high frequency of not less than a second threshold. For example, the first threshold can be set to 0.5 Hz, and the second threshold can be set to 30 Hz.

Note here that, in a case where the flakes are employed as the shape anisotropy members 32, a thickness of each of the flakes is preferably not more than 1 (one) μm, more preferably not more than 0.1 μm. As each of the flakes becomes thinner, the transmittance becomes higher.

Note that, in (a) of FIG. 1, a minus side of the power supply 33 is connected to the electrodes 12 and a plus side of the power supply 33 is connected to the electrode 22, but Embodiment 1 is not limited to such a configuration. Alternatively, the minus side of the power supply 33 can be connected to the electrode 22, and the plus side can be connected to the electrodes 12, as illustrated in (c) of FIG. 1. According to a configuration illustrated in (c) of FIG. 1, the flakes are oriented so as to adhere to the substrate 10. Note also that FIG. 1 illustrates a case where an electric charge with which each of the flakes is charged has a negative polarity. However, Embodiment 1 is not limited to such a configuration. Alternatively, the electric charge with which each of the flakes is charged can have a positive polarity. In this case, the flakes adhere to the substrate 10 in an example illustrated in (a) of FIG. 1, and the flakes adhere to the substrate 20 in an example illustrated in (c) of FIG. 1.

The following description will discuss effects brought about by Examples of Embodiment 1 while comparing those brought about by Comparative Examples. In the following Examples and Comparative Examples, an optical modulation layer had a cell thickness of 80 μm, and an alternating voltage of 3 V was applied, at a frequency of 60 Hz, to electrodes sandwiching the optical modulation layer, unless otherwise specified. As a medium, propylene carbonate was employed. Further, as a core of each of shape anisotropy members (flakes), a flake-shaped aluminum having a major axis of 7 μm and a thickness of 0.1 μm was employed.

(Comparative Example 1)

FIG. 4 is an image obtained by capturing, with the use of a microscope, a state where the flakes of Comparative Example 1 were vertically oriented (plan view). In Comparative Example 1, no covering layer was provided. Therefore, in a case where the shape anisotropy members were vertically oriented, the shape anisotropy members strongly (widely) cohered with each other. In a case where the shape anisotropy members cohere with each other, a transmittance becomes nonuniform, so that such nonuniformity is recognized as display unevenness by a viewer. Furthermore, the shape anisotropy members cohering with each other can bridge electrodes.

(Example 1)

FIG. 5 is an image obtained by capturing, with the use of a microscope, a state where flakes of Example 1 were vertically oriented (plan view). In Example 1, acrylic resin was employed as a covering layer, made of resin, which covered an entire periphery of a core. The covering layer had a thickness of 0.002 μm. By providing, on the entire periphery of the core made of aluminum, the covering layer, made of resin, which had the thickness of 0.002 μm, the shape anisotropy members less cohered with each other, as compared with Comparative Example 1.

(Example 2)

FIG. 6 is an image obtained by capturing, with the use of a microscope, a state where flakes of Example 2 were vertically oriented (plan view). In Example 2, acrylic resin was employed as a covering layer, made of resin, which covered an entire periphery of a core. The covering layer had a thickness of 0.04 μm. By employing the covering layer thicker than that of Example 1, cohesion of the shape anisotropy members was further suppressed, as compared with Example 1.

(Example 3)

FIG. 7 is an image obtained by capturing, with the use of a microscope, a state where flakes of Example 3 were vertically oriented (plan view). In Example 3, acrylic resin was employed as a covering layer, made of resin, which covered an entire periphery of a core. The covering layer had a thickness of 0.1 μm. By employing the covering layer thicker than that of Example 2, cohesion of the shape anisotropy members was further suppressed, as compared with Example 2.

As is clear from Examples 1 through 3, the thicker a covering layer is, the higher an effect of suppressing cohesion is.

(Example 4)

FIG. 8 is an image obtained by capturing, with the use of a microscope, a state where flakes of Example 4 were vertically oriented (plan view). In Example 4, silicon dioxide was employed as a covering layer which covered an entire periphery of a core. The covering layer had a thickness of 0.1 μm. By employing, as the covering layer, silicon dioxide instead of resin, cohesion of the shape anisotropy members was further suppressed, as compared with Example 3. Furthermore, in Example 4, the shape anisotropy members were dispersed so as to avoid each other. This allows a transmittance to be more uniform and ultimately allows display to be carried out without unevenness.

(Comparative Example 2)

As Comparative Example 2, a case will be described below where flakes were employed in each of which only two surfaces, instead of all of surfaces, of a core were covered by resin. In Comparative Example 2, an optical modulation layer had a cell thickness of 160 μm, and an alternating voltage of 5 V was applied, at a frequency of 60 Hz, to electrodes sandwiching the optical modulation layer. As a medium, propylene carbonate was employed. Further, as the core of each of the flakes, a flake-shaped aluminum having a major axis of 150 μm and a thickness of 0.1 μm was employed.

FIG. 9 is a view schematically illustrating a configuration of a flake 101 of Comparative Example 2. (a) of FIG. 9 is a plan view illustrating the configuration of the flake 101. (b) of FIG. 9 is a cross-sectional view taken along a line C-C. (c) of FIG. 9 is a cross-sectional view taken along a line D-D. The flake 101 included (i) a core 102 made of aluminum and (ii) a polyester film (resin layer) 103 provided on both surfaces (a front surface and a back surface) of the core 102. No polyester film 103 was provided on the other surfaces (a left side surface, a right side surface, an upper surface, and a lower surface) of the core 102. The polyester film 103 had a thickness of 6 μm.

FIG. 10 is an image obtained by capturing, with the use of a microscope, a state where the flakes of Comparative Example 2 were vertically oriented (plan view). Although the resin layer (having the thickness of 6 μm) of Comparative Example 2 was thicker than the covering layer (having the thickness of 0.1 μm) of Example 3, the flakes of Comparative Example 2 cohered with each other more strongly than those of Example 3. That is, by covering an entire periphery of a core with a covering layer, the effect of suppressing cohesion is increased. Furthermore, according to a configuration of Comparative Example 2, all of the surfaces of the core, which was an electric conductor, were not covered. Therefore, it is likely that electricity is conducted between the core and the electrodes via both surfaces (the upper surface and the lower surface), in a long axis direction, of the core.

(Effects of Display Device 1)

In a case where all of the surfaces of the core 34 are covered by the covering layer 35 as in the display device 1 of Embodiment 1, it is possible to suppress cohesion of the shape anisotropy members 32. Further, since the all of the surfaces of the core 34 are covered by the covering layer 35, it is not necessary to provide an insulator, for preventing leakage, on the electrodes 12. Similarly, it is not necessary to provide an insulator, for preventing leakage, on the electrode 22. Furthermore, since the core 34 is not in direct contact with any of the electrodes 12 and 22, it is possible to prevent oxidation-reduction reaction of metal making up the core 34. It is also possible to improve chemical resistance. Moreover, since it is possible to prevent cohesion of the shape anisotropy members 32, a display quality does not deteriorate even after display (vertical orientation, horizontal orientation) is repeated for a long time. Therefore, the display device 1 is capable of suppressing display unevenness and, accordingly, increasing a display quality.

Furthermore, in a case where the covering layer 35 made of, for example, resin having a low specific gravity is provided on the core 34 made of metal having a high specific gravity, it is possible to lower a specific gravity of each of the shape anisotropy members 32 which specific gravity is an average of the specific gravities of the core 34 and the covering layer 35. It is therefore possible to suppress sedimentation of the shape anisotropy members 32 and, accordingly, possible to improve dispersibility of the shape anisotropy members 32 in the optical modulation layer 30.

According to a configuration of Patent Literature 1, reflected light is synthesized by multi-layered flakes. Therefore, a reflection spectrum (a hue of the reflected light) varies depending on an angle at which a display surface is viewed. That is, the reflected light looks colored depending on an angle at which the display surface is viewed.

In contrast, according to the display device 1 of Embodiment 1, it is possible to reduce a difference in refractive index between the medium 31 and the covering layer 35 or possible to cause the covering layer 35 to have such a film thickness that strong interference does not occur in reflected light. This ultimately makes it possible to prevent a reflection spectrum (hue) of the reflected light from varying depending on an angle at which the display surface is viewed, even in a case where a transparent material is employed as the covering layer 35. Therefore, the display device 1 is capable of carrying out angle-independent display.

[Variations]

The above description has discussed a transmissive display device. However, the shape anisotropy members 32 are also applicable to a reflective or transflective display device. The following description will discuss Variations of Embodiment 1.

(Reflective Display Device)

(a) and (b) of FIG. 11 are cross-sectional views each schematically illustrating a configuration of a reflective display device 1a. The display device 1a includes a display panel 2a and driving circuits (not illustrated), and is a reflective display device which carries out display by causing the display panel 2a to reflect external light that enters the display panel 2a.

The display panel 2a includes (i) a pair of substrates 10a and 20 which are provided so as to face each other and (ii) an optical modulation layer 30a which is provided between the pair of substrates 10a and 20. The substrate 10a (first substrate) is provided on a back surface side of the display panel 2a, and the substrate 20 (second substrate) is provided on a display surface side (viewer side) of the display panel 2a. Further, the display panel 2a has a plurality of pixels arranged in a matrix manner.

The substrate 10a includes (i) an insulating substrate made up of, for example, a transparent glass substrate and (ii) electrodes 12 (first electrodes). The substrate 20 includes (i) an insulating substrate made up of, for example, a transparent glass substrate and (ii) an electrode 22 (second electrode).

The substrate 10a constitutes an active matrix substrate. Specifically, the substrate 10a includes a glass substrate 11 on which various signal lines (such as scanning signal lines and data signal lines) (not illustrated), thin film transistors (TFTs) (not illustrated), and an insulating film (not illustrated) are provided. A light absorbing layer 13 and the electrodes 12 are provided on those members. The light absorbing layer 13 has such a property that the light absorbing layer 13 absorbs light having a wavelength in at least a given range, among light that enters the light absorbing layer 13. The light absorbing layer 13 can be colored. For example, the light absorbing layer 13 is colored black.

The optical modulation layer 30a is provided between the electrodes 12 and the electrode 22, and includes a medium 31 and a plurality of shape anisotropy members 32a contained in the medium 31. The optical modulation layer 30a is configured such that a voltage is applied to the optical modulation layer 30a by a power supply 33 connected to the electrodes 12 and the electrode 22. Depending on a change in frequency of such an applied voltage, the optical modulation layer 30a changes its reflectance with respect to light (external light) that enters the optical modulation layer 30 from the outside.

Each of the shape anisotropy members 32a includes (i) a core, made of metal, which reflects light and (ii) a covering layer which transmits visible light, and has a property of reflecting the visible light. The each of the shape anisotropy members 32a can be colored. The shape anisotropy members 32a are identical, in the other properties, to the shape anisotropy members 32 described in Embodiment 1.

In a case where a voltage (alternating voltage) having a high frequency, e.g., a frequency of 60 Hz is applied to the optical modulation layer 30a, flakes (the shape anisotropy members 32a) rotate so that each long axis of the flakes is in parallel to an electric flux line (see (b) of FIG. 11). That is, the flakes are oriented (vertically oriented) so that the each long axis of the flakes is perpendicular to the substrates 10a and 20. This causes external light that enters the optical modulation layer 30a to be transmitted by (passes through) the optical modulation layer 30a and then absorbed by the light absorbing layer 13. This ultimately causes black color of the light absorbing layer 13 to be viewed by a viewer (black display).

On the other hand, in a case where a voltage having a low frequency, e.g., a frequency of 0.1 Hz, or a direct voltage (having a frequency of 0 (zero) Hz) is applied to the optical modulation layer 30a, the flakes, each of which has an electrostatic property, are drawn to a vicinity of one of the electrodes which one is charged with an electric charge having a polarity opposite to that of an electric charge with which each of the flakes is charged. The flakes are then most stably oriented, so that the flakes rotate so as to adhere to the substrate 10a or 20. That is, the flakes are oriented (horizontally oriented) so that the each long axis of the flakes is in parallel to the substrates 10a and 20 (see (a) of FIG. 11). This causes external light that enters the optical modulation layer 30a to be reflected by the flakes. This ultimately allows a reflection display.

Note here that, by arranging the flakes to (i) have an average diameter of, for example, not more than 20 µm, (ii) each have an uneven surface so as to have a light scattering property, or (iii) each have an extremely uneven contour line, it is possible to scatter reflected light and, accordingly, possible to carry out white display.

Alternatively, in a case where the core has a flat surface (mirror surface), it is possible to carry out display in which specularity is high (mirror reflection), because most of reflecting surfaces of the flakes are positioned on an identical plane surface in a state where the flakes are horizontally oriented ((a) of FIG. 11).

(a) of FIG. 12 illustrates a state where, in a case where (i) a direct voltage is applied to the optical modulation layer 30a and (ii) a polarity (positive) of an electric charge, with which each of the electrodes 12 of the substrate 10a is charged, is different from a polarity (negative) of an electric charge with which each of the flakes is charged, the flakes are oriented so as to adhere to the substrate 10a. According to a configuration illustrated in (a) of FIG. 12 in which configuration the flakes are oriented on a substrate 10a side, that is, a back surface side, the flakes are viewed, from a viewer side, as if the flakes are accumulated. Since an uneven surface is thus formed by the flakes, it is possible to carry out display in which light is widely scattered.

Note that it is possible to realize a display device 1a which switches between black display (vertical orientation ((b) of FIG. 11 and (b) of FIG. 12)), white display (horizontal orientation ((a) of FIG. 12)), and mirror reflection (horizontal orientation ((a) of FIG. 11)), by (i) configuring the display device 1a so as to switch, in a case of horizontal orientation, between the state illustrated in (a) of FIG. 11 and the state illustrated in (a) of FIG. 12 by control of a polarity of a direct voltage to be applied to the optical modulation layer 30a and (ii) providing, for example, a back light absorbing layer 13 on the back surface side.

Note also that, in a case where (i) a color filter (not illustrated) is provided on the substrate 20 and (ii) the optical modulation layer 30a is arranged such that the flakes are oriented on the substrate 20 on a viewer side as illustrated in (a) of FIG. 11, it is possible to suppress parallax occurring between the optical modulation layer 30a and the color filter. This allows a high-quality color display to be realized.

Note also that the display device 1a can be arranged such that (i) a light reflecting layer, which carries out regular reflection or scatter reflection, is provided, instead of the light absorbing layer 13, on the back surface side of the display panel 2a and (ii) each of the flakes is made up of a colored member so that (a) a color display is carried out by the flakes during the horizontal orientation and (b) a reflection display is carried out by the light reflecting layer during the vertical orientation.

Such a display device 1a can be also provided on a non-display surface (a body surface or the like which is not a normal image display surface) of, for example, a mobile phone. In a case where such a mobile phone is configured such that each of the electrodes 12 and the electrode 22 of the display device 1a are made up of a transparent electrode, it is possible to display a body color of the mobile phone on the non-display surface by vertically orienting the flakes, whereas it is possible to display each color of the flakes on the non-display surface or reflect external light by horizontally orienting the flakes. Note that, by horizontally orienting the flakes, it is possible to use the display device 1a as a mirror (mirror reflection). According to such a display device 1a, since the electrodes 12 and the electrode 22 can be each made up of a segment electrode or an allover electrode, it is possible to simplify a circuit configuration.

Furthermore, the display device 1a can be employed as, for example, a switching panel for 2D/3D display. Specifically, the display device 1a is provided, as the switching panel, on a front surface of a normal liquid crystal display panel. The display device 1a is configured such that the flakes, colored black, are provided in stripes. During 2D display, the flakes are vertically oriented so that an image, displayed on an entire surface of the liquid crystal display panel, is visible. During 3D display, the flakes are horizontally oriented in stripes, and an image for a right side and an image for a left side are displayed on the liquid crystal display panel. This ultimately causes the image for a right side and the image for the left side to be recognized as a three-dimensional image. It is thus possible to realize a liquid crystal display device capable of switching between 2D display and 3D display. The above configuration is applicable to a liquid crystal display device which carries out multi-view display such as dual-view display.

(Transflective Display Device)

(a) and (b) of FIG. 13 are cross-sectional views each schematically illustrating a configuration of a transflective display device 1b. The transflective display device 1b includes a display panel 2b, a backlight 3 which irradiates the display panel 2b with light, and driving circuits (not illustrated). The transflective display device 1b is a so-called transflective display device which (i) carries out display by causing light emitted from the backlight 3 to be transmitted and (ii) carried out display by causing external light that enters the display device 1b to be reflected.

The display panel 2b includes (i) a pair of substrates 10 and 20 which are provided so as to face each other and (ii) an optical modulation layer 30b which is provided between the pair of substrates 10 and 20. The substrate 10 (first substrate) is provided on a back surface side of the display panel 2b, and the substrate 20 (second substrate) is provided on a display surface side (viewer side). Further, the display panel 2b has a plurality of pixels arranged in a matrix manner.

The substrates 10 and 20 are identical in configuration to the substrates 10 and 20, respectively, described in Embodiment 1.

The optical modulation layer 30b is provided between the electrodes 12 and the electrode 22, and includes a medium 31 and a plurality of shape anisotropy members 32a contained in the medium 31. The optical modulation layer 30b is configured such that a voltage is applied to the optical modulation layer 30b by a power supply 33 connected to the electrodes 12 and the electrode 22. Depending on a change in frequency of such an applied voltage, the optical modulation layer 30b changes its transmittance with respect to light that enters the optical modulation layer 30b from the backlight 3 and its reflectance with respect to light (external light) that enters the optical modulation layer 30b from the outside.

The shape anisotropy members 32a are identical in configuration to the shape anisotropy members 32a of the transmissive display device 1a.

According to the above configuration, in a case where a voltage (alternating voltage) having a high frequency, e.g., a frequency of 60 Hz, is applied to the optical modulation layer 30b flakes rotate so that each long axis of the flakes is in parallel to an electric flux line (see (b) of FIG. 13). That is, the flakes are oriented (vertically oriented) so that the each long axis of the flakes is perpendicular to the substrates 10 and 20. This causes light that enters the optical modulation layer 30 from the backlight 3 to be transmitted by (passes through) the optical modulation layer 30 and then exit to the viewer side. Transmission display is thus carried out.

On the other hand, in a case where a voltage having a low frequency, e.g., a frequency of 0.1 Hz, or a direct voltage (having a frequency of 0 (zero) Hz) is applied to the optical modulation layer 30a, the flakes, each of which has an electrostatic property, are drawn to a vicinity of one of the electrodes which one is charged with an electric charge having a polarity opposite to that of an electric charge with which each of the flakes is charged. The flakes are then most stably oriented, so that the flakes rotate so as to adhere to the substrate 10 or 20. That is, the flakes are oriented (horizontally oriented) so that the each long axis of the flakes is in parallel to the substrates 10 and 20 as illustrated in (a) of FIG. 13. This causes external light that enters the optical modulation layer 30b to be reflected by the flakes. Reflection display is thus carried out.

The display device 1b is thus configured so as to carry out display while switching between a reflection display mode and a transmission display mode.

(Cell Thickness)

The optical modulation layer preferably has a sufficient thickness (cell thickness) for the flakes to be vertically oriented as illustrated in, for example, (b) of FIG. 1. However, the optical modulation layer is not limited to such a thickness, and can have such a thickness that the flakes remain at an intermediate angle (the flakes are obliquely oriented). That is, the cell thickness can be set to a thickness which is smaller than each long axis of the flakes and which causes light reflected by the flakes not to be directly emitted to the display surface side in a case where the flakes are obliquely oriented at a maximum angle with respect to the substrates. Specifically, in a case where the reflective display device 1a, which includes the black light absorbing layer 13 on the back surface side of the display panel 2a, employs a medium 31 having a refraction index of 1.5 for the optical modulation layer 30a, the cell thickness is set so that an angle θ, made by a direction normal to a surface of the display panel and a direction normal to each surface of the flakes, is 42 degrees or more, as illustrated in (b) of FIG. 14. This at least allows light reflected by the flakes not to be emitted through the substrate provided on the viewer side. It is therefore possible to appropriately carry out black display.

(Shape of Shape Anisotropy Member)

As the shape anisotropy members, bowl-shaped flakes (flakes each having an uneven surface) can be also employed. (a) and (b) of FIG. 15 each illustrate a state where the reflective display device 1a employs bowl-shaped shape anisotropy members 32a. Each of the bowl-shaped shape anisotropy members 32a includes a curved core and a covering layer which is a dielectric and which covers an entire periphery of the curved cure.

According to the above configuration, it is possible to improve the light scattering property, as compared with the flat (flat-surface) flakes (see FIG. 11). Note that (c) of FIG. 15 illustrates a state where a direct voltage applied to the optical modulation layer 30a has a polarity opposite to that of a direct voltage applied to the optical modulation layer 30a illustrated in (a) of FIG. 15.

(How to Apply Voltage)

How to apply a voltage to the optical modulation layer is not limited to a configuration in which a voltage to be applied to the optical modulation layer is switched between a direct voltage and an alternating voltage. Alternatively, a configuration can be employed in which a voltage to be applied to the optical modulation layer is substantially switched between a direct voltage and an alternating voltage (a magnitude relationship between a direct current component and an alternating current component is adjusted) by applying an offset voltage, preferably an offset voltage whose value is lower than a maximum value of an alternating voltage, to a counter electrode (common electrode) and changing an intensity (amplitude) of the alternating voltage.

According to the display device of the present invention, it is considered that halftone display can be carried out depending on a level and a frequency of an alternating voltage applied to the optical modulation layer, a size of each of the flakes, or the like. For example, by mixing together flakes having different sizes, it is possible to change orientation of each of the flakes depending on the sizes of the flakes. This is considered to make it possible to control a light transmittance (halftone display) depending on a level and a frequency of an alternating voltage.

[Embodiment 2]

The following description will discuss Embodiment 2 of the present invention. Note that, for convenience, identical reference numerals are given to respective members and configurations having functions identical to those described with reference to the drawings in Embodiment 1, and the members and configurations will not be described here.

(Configuration of Display Device)

(a) through (c) of FIG. 16 are cross-sectional views each schematically illustrating a configuration of a display device 1*d* in accordance with Embodiment 2. The display device 1*d* includes a display panel 2*d*, a backlight 3 which irradiates the display panel 2*d* with light, and driving circuits (not illustrated). The display device 1*d* is a transmissive display device which carries out display by causing light emitted from the backlight 3 to pass through the display panel 2*d*.

The display panel 2*d* includes (i) a pair of substrates 10 and 20 which are provided so as to face each other and (ii) an optical modulation layer 30*d* which is provided between the pair of substrates 10 and 20. The substrate 10 (first substrate) is provided on a backlight 3 side (back surface side), and the substrate 20 (second substrate) is provided on a display surface side (viewer side). Further, the display panel 2*d* has a plurality of pixels arranged in a matrix manner.

The substrate 10 includes (i) an insulating substrate 11 made up of, for example, a transparent glass substrate and (ii) electrodes 12 (first electrodes). The substrate 20 includes (i) an insulating substrate 21 made up of, for example, a transparent glass substrate and (ii) an electrode 22 (second electrode).

At least a side of the substrate 10 on which side the substrate 10 is in contact with the optical modulation layer 30*d* is subjected to hydrophobic treatment, and at least a side of the substrate 20 on which side the substrate 20 is in contact with the optical modulation layer 30*d* is subjected to hydrophilic treatment. By subjecting the substrate 10 to the hydrophobic treatment, the substrate 10 is caused to be in contact with a non-polar solvent, out of a polar solvent and the non-polar solvent each of which is contained in the optical modulation layer 30*d*. Concrete examples of a method of carrying out the hydrophobic treatment encompass (i) a method of spin-coating a substrate with fluorocarbon resin such as Teflon AF (Registered Trademark) (manufactured by DuPont) or CYTOP (manufactured by Asahi Glass Co., Ltd.) and (ii) a method of forming a parylene film on a substrate by CVD (Chemical Vapor Deposition).

Furthermore, by subject the substrate 20 to the hydrophilic treatment, the substrate 20 is caused to be in contact with the polar solvent, out of the polar solvent and the non-polar solvent each of which is contained in the optical modulation layer 30*d*. Concrete examples of a method of carrying out the hydrophilic treatment encompass (i) a method of forming, on a substrate, an inorganic oxide film made of silicon oxide, titanium oxide, aluminum oxide, zinc oxide, or the like by vacuum vapor deposition, sputtering, CVD, PVD (Physical Vapor Deposition), a sol-gel method, coating or the like and (ii) a method of treating a surface of a substrate with an agent such as a silane coupling agent having a polar group.

Note that, alternatively, the substrate 20 can be subjected to the hydrophobic treatment, and the substrate 10 can be subjected to the hydrophilic treatment.

As has been described, the display device of Embodiment 2 is configured such that one of the pair of the substrates has a hydrophilic property and is in contact with the polar solvent, and the other has a hydrophobic property and is in contact with the non-polar solvent.

The optical modulation layer 30*d* is provided between the electrodes 12 and the electrode 22, and includes a medium (a polar solvent 31*a* and a non-polar solvent 31*b*) and a plurality of shape anisotropy members 32 contained in the medium.

Each surface of the shape anisotropy members 32 has a hydrophilic property or a hydrophobic property. For example, in a case where silicon dioxide or aluminum oxide is employed as a covering layer, each of the shape anisotropy members 32 has the hydrophilic property. In a case where fluorocarbon resin or PET (polyethylene terephthalate) is employed as the covering layer, each of the shape anisotropy members 32 has the hydrophobic property. As a method of carrying out hydrophobic treatment, a method of covering a core with fluorocarbon resin by dip coating can be employed. Note that FIG. 16 illustrates a case where each of the shape anisotropy members 32 has the hydrophilic property. Note also that each of the shape anisotropy members does not need to have an electrostatic property, unlike those described in Embodiment 1.

The medium contains (i) the polar solvent 31*a* which is in contact with the substrate 20 having the hydrophilic property and (ii) the non-polar solvent 31*b* which is in contact with the substrate 10 having the hydrophobic property. Each of the polar solvent 31*a* and the non-polar solvent 31*b* is a material having a light-transmitting property with respect to light in a visible light region. As each of the polar solvent 31*a* and the non-polar solvent 31*b*, a liquid which hardly absorbs light in the visible light region or a liquid which hardly absorbs light in the visible light region and is colored with the use of a pigment can be, for example, employed. A specific gravity of the polar solvent 31*a* is preferably identical or equivalent to that of the non-polar solvent 31*b*. Furthermore, the specific gravities of the polar solvent 31*a* and the non-polar solvent 31*b* are preferably identical or equivalent to that of each of the shape anisotropy members 32.

Further, each of the polar solvent 31*a* and the non-polar solvent 31*b* is preferably low in volatileness, in view of a process of sealing the polar solvent 31*a* and the non-polar solvent 31*b* inside a cell (optical modulation layer 30*d*). A viscosity of each of the polar solvent 31a and the non-polar solvent 31b relates to responsiveness, and is preferably not more than 5 mPa·s.

Each of the polar solvent 31a and the non-polar solvent 31b can be made of a single substance or can be alternatively made of a mixture of a plurality of substances. For example, the polar solvent 31a can be made of: water; an organic solvent such as alcohol, acetone, formamide, and ethylene glycol; an ionic liquid; or a mixture thereof. The non-polar solvent 31b can be made of silicone oil and/or aliphatic hydrocarbon.

As has been described, the display panel 2d includes a power supply 33, the shape anisotropy members 32 each having the hydrophilic property, the polar solvent 31a in contact with the substrate having the hydrophilic property, and the polar-solvent 31b in contact with the substrate having the hydrophobic property. According to the above configuration, while no voltage is being applied to the optical modulation layer 30d, the shape anisotropy members 32 are confined within a given small region, that is, the polar solvent 31a in a state where the shape anisotropy members 32 are dispersed in the polar solvent 31a. Note that, in a case where each of the shape anisotropy members 32 has the hydrophobic property, the shape anisotropy members 32 are confined within a given small region, that is, the non-polar solvent 31b in a state where the shape anisotropy members 32 are dispersed in the non-polar solvent 31b, while no voltage is being applied to the optical modulation layer 30d.

Note here that a ratio (i.e., layer thickness) of the polar solvent 31a is preferably different from that of the non-polar solvent 31b.

For example, in a case where each of the shape anisotropy members 32 has the hydrophilic property ((a) of FIG. 1), the ratio (layer thickness) of the polar solvent 31a is controlled to be smaller than that of the non-polar solvent 31b. In this case, the layer thickness of the polar solvent 31a is preferably not more than 1 μm, and is preferably equal to a thickness of each of the shape anisotropy members 32 or a total thickness of several of the shape anisotropy members 32. The shape anisotropy members 32 are stably oriented at respective positions in the polar solvent 31a, which is a small region. In a case where flakes are employed as the shape anisotropy members 32, the flakes are oriented (horizontally oriented) so as to adhere to one of the substrates which one has the hydrophilic property (the substrate 20 in FIG. 16).

In a case where each of the shape anisotropy members 32 has the hydrophobic property, the ratio (layer thickness) of the non-polar solvent 31b is controlled to be smaller than that of the polar solvent 31a. In this case, the layer thickness of the non-polar solvent 31b is preferably not more than 1 μm, and is preferably equal to a thickness of each of the shape anisotropy members 32 or a total thickness of several of the shape anisotropy members 32. The shape anisotropy members 32 are stably oriented at respective positions in the non-polar solvent 31b, which is a small region. In a case where flakes are employed as the shape anisotropy members 32, the flakes are oriented (horizontally oriented) so as to adhere to the substrate having the hydrophobic property.

(How to Control Transmittance)

Next, how the optical modulation layer 30d controls its transmittance with respect to light will be described below in detail. Note that a case will be described here where flakes each having the hydrophilic property are employed as the shape anisotropy members 32.

While neither an alternating voltage nor a direct voltage is being applied to the optical modulation layer 30d, the flakes are confined within a given small region, that is, the polar solvent 31a in a state where the flakes are dispersed in the polar solvent 31a (see (a) of FIG. 16). That is, the flakes are stably oriented at respective positions in the polar solvent 31a (the flakes are stably oriented in the polar solvent 31a) so as to adhere to the substrate 20 having the hydrophilic property (horizontal orientation). This causes light that enters the optical modulation layer 30d from the backlight 3 to be blocked by the flakes, so that the light is not transmitted by (does not pass through) the optical modulation layer 30d.

In a case where an alternating voltage or a direct voltage is applied to the optical modulation layer 30d, the flakes rotate so that each long axis of the flakes is in parallel to an electric flux line (see (b) of FIG. 16). That is, the flakes are oriented (vertically oriented) so that the each long axis of the flakes is perpendicular to the substrates 10 and 20. This causes light that enters the optical modulation layer 30d from the backlight 3 to be transmitted by (passes through) the optical modulation layer 30d and then exit to the viewer side.

In a case where the application of the voltage to the optical modulation layer 30d is terminated in (b) of FIG. 16, the flakes rotates as illustrated in (c) of FIG. 16 by interfacial tension generated between the flakes and the non-polar solvent 31b. The flakes are ultimately oriented (horizontally oriented) so that the each long of the flakes is in parallel to the substrates 10 and 20 as illustrated in (a) of FIG. 16. This causes light that enters the optical modulation layer 30d from the backlight 3 to be blocked by the flakes, so that the light is not transmitted by (does not pass through) the optical modulation layer 30d.

Here, how the flakes are oriented (vertical orientation, horizontal orientation, orientation intermediate between the vertical and the horizontal orientations, orientation inclined by a given degree with respect to the horizontal orientation, or the like) is determined depending on a balance between (i) torque which causes rotation and (ii) interfacial tension which relates to a length L (see (c) of FIG. 16) of each part of the flakes which part is located in the non-polar solvent 31b. For example, in a case where the layer thickness of the polar solvent 31a is sufficiently larger than that of each of the flakes, it is not possible to fully control inclination of each of the flakes from when no voltage is applied to the optical modulation layer 30d to when the flakes start to move into the non-polar solvent 31b, unless gravity or the like is utilized. In contrast, by controlling the layer thickness of the polar solvent 31a to be equivalent to or smaller (thinner) than (i) that of each of the flakes or (ii) a total thickness of several of the flakes in a case where the flakes are provided in an amount larger than that necessary to cover a display surface (substrate surface) during the horizontal orientation, it is possible to reduce or remove so-called play of each of the flakes and, accordingly, possible to control the inclination of each of the flakes.

An advantage of a case where the layer thickness of the polar solvent 31a is sufficiently larger (thicker) than that of each of the flakes is that it is possible to surely secure torque for rotation of the flakes by application of a voltage, because it is possible to averagely and slightly incline, with respect to the electric flux line, a direction normal to each surface of the flakes.

Further, in a case where (i) each surface (surface of the covering layer) of the flakes is modified with an ionic silane coupling agent or the like so that each of the flakes is positively or negatively charged in the medium and (ii) a direct voltage is applied to the optical modulation layer 30d, it is possible to utilize (a) a force causing the flakes to be horizontally oriented by interfacial tension and (b) an electrophoretic force. This makes it possible to further increase a response speed.

By thus switching between application of a voltage and application of no voltage to optical modulation layer 30d, it is possible to switch between the vertical orientation and the horizontal orientation of the flakes and, accordingly, possible to change the transmittance (amount of transmitted light) with respect to light that enters the optical modulation layer 30d from the backlight 3.

Furthermore, by configuring the display device 1d as described in Embodiment 2, it is possible to prevent the flakes from being actively dispersed (i) in the non-polar solvent in a case where each of the flakes has the hydrophilic property and (ii) in the polar solvent in a case where each of the flakes has the hydrophobic property. This ultimately allows a reduction in occurrence of such cohesion of the flakes that forms a bridge.

[Variations]

(a) and (b) of FIG. 17 are cross-sectional views each schematically illustrating a configuration of a display device 1 in accordance with a Variation. According to the present Variation, a glass substrate 11 is subjected to hydrophilic treatment, and a glass substrate 21 is subjected to hydrophobic treatment. A polar solvent 31a is in contact with a substrate 10, and a non-polar solvent 31b is in contact with a substrate 20. Each of flakes (shape anisotropy members 32) is subjected to hydrophilic treatment. This causes the flakes (i) to be stably and horizontally oriented so as to adhere to the substrate 10 during application of no voltage (see (a) of FIG. 17) and (ii) to be vertically oriented on a substrate 10 side during application of a voltage (see (b) of FIG. 17).

(a) and (b) of FIG. 18 are cross-sectional views each schematically illustrating a configuration of a display device 1 in accordance with another Variation. According to the another Variation, a glass substrate 11 is subjected to hydrophilic treatment, and a glass substrate 21 is subjected to hydrophobic treatment. A polar solvent 31a is in contact with a substrate 10, and a non-polar solvent 31b is in contact with a substrate 20. Each of flakes (shape anisotropy members 32) is subjected to hydrophobic treatment. Similar to FIG. 16, this causes the flakes (i) to be stably and horizontally oriented so as to adhere to the substrate 20 during application of no voltage (see (a) of FIG. 18) and (ii) to be vertically oriented on a substrate 20 side during application of a voltage (see (b) of FIG. 18). Note that, in this case, a ratio (layer thickness) of the non-polar solvent 31b is smaller than that of the polar solvent 31a.

Note here that, in the display panel 2d, a rib 24 is provided on one of the substrates to which one the flakes adhere (the substrate 20 in FIG. 16). This makes it possible to prevent a bias in flake density which bias is caused by cohesion of the flakes due to, for example, gravity or application of a voltage.

A shape of the rib 24 is not limited to any particular one, provided that the rib 24 prevents the flakes from moving so as to bias in an in-plane direction. For example, a lattice-shaped rib 24 as illustrated in (a) of FIG. 19 can be provided or ribs 24 can be provided in a pattern of islands as illustrated in (b) of FIG. 19. Note that FIG. 16 illustrates the lattice-shaped rib 24 (as illustrated in (a) of FIG. 19). In a case of, for example, a display device having a plurality of pixels, regions partitioned by the lattice-shaped rib 24 can have (i) sizes corresponding to respective regions of the plurality of pixels, (ii) sizes corresponds to respective regions into which each of the plurality of pixels is sectioned, or (iii) sizes corresponding to respective regions each containing some of the plurality of pixels.

A height of the rib 24 is not limited to any particular one, provided that the height is equal to or larger than the layer thickness of the polar solvent 31a or the non-polar solvent 31b in which the flakes are dispersed. For example, in a case where the height of the rib 24 is set to be equivalent to a desired cell thickness, it is possible to cause the rib 24 to serve as a spacer for securing a distance between the substrate 10 and the substrate 20. Alternatively, in a case where the height is set to be (i) equivalent to or larger than the layer thickness of the polar solvent 31a or the non-polar solvent 31b in which the flakes are dispersed and (ii) approximately not more than 5 μm, it is possible to set a width of the rib 24 to be extremely narrow and, therefore, possible to reduce an region in which the flakes do not exit.

A material of the rib 24 is not limited to any particular one, provided that the above shape can be formed. Examples of the material include a photosensitive resin for forming a general resin spacer.

The rib 24 can be formed on the one of the substrates after being subjected to hydrophobic treatment or hydrophilic treatment. However, it is preferable to first form the rib 24 on the one of the substrates and then carry out the hydrophobic treatment or the hydrophilic treatment, (i) in order to keep constant locations of the polar solvent 31a and the non-polar solvent 31b in a vicinity of the rib 24 and (ii) from the view point of easiness in process.

By thus forming the rib 24, it is possible to confine the polar solvent 31a (or non-polar solvent 31b), in which the flakes are dispersed, within a compartment or continuous compartments surrounded by the one of the substrates, the rib 24, and the nonpolar solvent 31b (or the polar solvent 31a).

[Embodiment 3]

The following description will discuss further another embodiment. Note that, for convenience, identical reference numerals are given to respective members and configurations having functions identical to those described with reference to the drawings in Embodiment 1, and the members and configurations will not be described here.

(Configuration of Display Device)

(a) and (b) of FIG. 20 are cross-sectional views each schematically illustrating a configuration of a display device in accordance with Embodiment 3. (a) of FIG. 20 illustrates how light is transmitted. (b) of FIG. 20 illustrates how light is reflected.

As illustrated in (a) and (b) of FIG. 20, a display device 1e in accordance with Embodiment 3 includes a display panel 2e, a backlight 3 which irradiates the display panel 2e with light, and driving circuits (not illustrated). The display device 1 is a transmissive display device which carries out display by causing the display panel 2e to transmit light emitted from the backlight 3.

The display panel 2e includes (i) a pair of substrates 10e and 20 which are provided so as to face each other, (ii) an optical modulation layer 30 which is provided between the pair of substrates 10e and 20, (iii) relay circuits 41 and 51 (switch circuits) each of which switches a direction of an electric field, to be applied to the optical modulation layer 30, by selecting an electrode to which a voltage is to be applied, and (iv) a power supply circuit 61.

Further, the display panel 2e has a plurality of pixels arranged in a matrix manner.

Shape anisotropy members 32 are similar in configuration to those of Embodiment 1. However, unlike those of Embodiment 1, each of the shape anisotropy members 32 does not need to have an electrostatic property.

Note that Embodiment 3 will describe, as an example, a case where, mainly, the substrate 10e (first substrate) is provided on a backlight 3 side (back surface side), and the substrate 20 (second substrate) is provided on a display surface side (viewer side). However, the substrate 10e can be provided on the display surface side (viewer side), and the substrate 20 can be provided on the backlight 3 side (back surface side).

(Configurations of Substrates)

The substrate 10e is an active matrix substrate. The substrate 10e includes an insulating substrate (glass substrate) 11 on which various signal lines (such as scanning signal lines and data signal lines) (not illustrated), switching elements such as TFTs (Thin Film Transistors) (not illustrated), and an insulating film (not illustrated) are provided. On those members, a lower layer electrode made up of an allover electrode 12 (first electrode), an insulating layer 16, and an upper layer electrode made up of a comb-shaped electrode 14 (second electrode) and comb-shaped electrodes 15 (third electrodes) (see FIG. 21) are layered in this order.

The allover electrode 12 is formed on the insulting substrate 11 so as to extend over an almost entire surface of the insulating substrate 11 which surface faces the substrate 20 and to cover a display region (region enclosed by a sealing agent) on the substrate 10e.

The insulating layer 16 is formed so as to extend over the entire display region on the substrate 10e and to cover the allover electrode 12.

FIG. 21 is a plan view of the substrate 10e which view schematically illustrates a configuration of the comb-shaped electrodes 14 and 15.

As illustrated in FIG. 21, the comb-shaped electrode 14 is a comb-shaped electrode having a patterned electrode section 14L (electrode line) and a space section 14S (electrode non-formed section). More specifically, the comb-shaped electrode 14 is made up of a main electrode 14B (main line) and divergent electrodes 14A (divergent lines) each of which serves as a tooth of a comb and each of which extends from the main electrode 14B.

Similarly, each of the comb-shaped electrodes 15 is a comb-shaped electrode having a patterned electrode section 15L (electrode line) and a space section 15S (electrode non-formed section). More specifically, each of the comb-shaped electrodes 15 is made up of a main electrode 15B (main line) and divergent electrodes 15A (divergent lines) each of which serves as a tooth of a comb and each of which extends from the main electrode 15B.

Note that (a) and (b) of FIG. 20 each illustrate cross sections of the divergent electrodes 14A and 15A as cross sections of the comb-shaped electrodes 14 and 15.

The number (m, n) of teeth (divergent electrodes 14A and 15A) of each of the comb-shaped electrodes 14 and 15, which teeth are provided in one of the plurality of pixels, is not limited in particular, and is determined depending on, for example, a relation between (i) a pixel pitch and (ii) L/S (that is, a line (an electrode width, i.e., a width of an electrode)/a space (an electrode pitch, i.e., a space between electrodes)) of each of the comb-shaped electrodes 14 and 15. Note here that "L" represents a width of each of the divergent electrodes 14A and 15A constituting the electrode sections 14L and 15L, respectively, and "S" represents a width of each of the space sections 14S and 15S.

Note, however, that the space sections 14S and 15S are set so as to be thicker than the divergent electrodes 14A and 15A, respectively. The comb-shaped electrodes 14 and 15 are provided so that the divergent electrodes 14A (14A1, 14A2, . . . 14Am; m is an integer not less than 1), serving as teeth of a comb, of the comb-shaped electrode alternate with the divergent electrodes 15A (15A1, 15A2 . . . 15An; n is an integer not less than 1 (one)), serving as teeth of a comb, of each of the comb-shaped electrodes 15 (see (a) and (b) of FIG. 20 and FIG. 21).

Therefore, the number of the divergent electrodes 14A and 15A are substantially determined depending on, for example, a relation among (i) the pixel pitch, (ii) the width of each of the divergent electrodes 14A and 15A, and (iii) the electrode pitch between adjacent divergent electrodes 14A and 15A.

Note that each of the divergent electrodes 14A and each of the divergent electrodes 15A can have a linear shape. Alternatively, each of the divergent electrodes 14A and each of the divergent electrodes 15A can have a V-shape or a zigzag shape.

The comb-shaped electrode 14 (second electrode), out of the comb-shaped electrodes 14 and 15, is a common electrode, and is electrically connected to a common wire provided around the display region.

Each of the comb-shaped electrodes 15 (third electrodes) is a pixel electrode, and is connected to signal lines (such as a scanning signal line and a data signal line) and a switching element such as a TFT, via a drain electrode (not illustrated). A signal which varies depending on a video signal is applied to the comb-shaped electrodes 15.

Note that a layer thickness of the insulating layer 16 is smaller than the electrode pitch between adjacent electrode sections 14L and 15L (that is, a distance between the adjacent divergent electrodes 14A and 15A which distance serves as a space in the upper layer electrode made up of the comb-shaped electrodes 14 and 15).

The layer thickness of the insulating layer 16 is set so as to fall within a range of, for example, 1000 Å to 30000 Å, depending on a type of the insulating layer 16 (for example, whether the insulating layer 16 is made up of an inorganic insulating film or an organic insulating film).

The layer thickness of the insulating layer 16 is not limited in particular, and only needs to be set as appropriate depending on the type of the insulating layer 16. However, as the layer thickness becomes thinner, the shape anisotropy members 32 in the optical modulation layer 30 move more (later described), and the display panel 2e can be made thinner. Therefore, the layer thickness is preferably thinner. Note, however, that the layer thickness of the insulating layer 16 is preferably not less than 1000 Å, from the view point of prevention of insulation-related failure and thickness uneven caused by a lattice defect.

As an example cell configuration, in a case where flakes each having a particle diameter (major axis) of 6 µm are, for example, employed as the shape anisotropy members 32, the electrode width of each of the comb-shaped electrodes 14 and 15 can be 3 µm, an electrode pitch between the comb-shaped electrodes 14 and 15 can be 5 µm, and a cell thickness can be 50 µm.

Note that a required configuration is not limited to such a configuration. However, it is preferable that each of the shape anisotropy members 32 (for example, flakes) (described later) have a particle diameter larger than the electrode width. This allows the flakes to be horizontally oriented on the comb-shaped electrodes which have a low horizontal electric field, in such a way that a space is not easily made between the flakes.

(Relay Circuit and Power Supply Circuit)

The allover electrode 12 provided on the substrate 10e is electrically connected to the power supply circuit 61 via the relay circuit 41 (first relay circuit). A wire 42 for applying a voltage to the allover electrode 12 is provided between the allover electrode 12 and the relay circuit 41.

An allover electrode (common electrode) 22 provided on the substrate 20 is electrically connected to the power supply circuit 61 via the relay circuit 51 (second relay circuit). A wire 52 for applying a voltage to the allover electrode 22 is provided between the allover electrode 22 and the relay circuit 51.

The comb-shaped electrodes 14 and 15 are electrically connected to the power supply circuit 61 via the relay circuits 41 and 51, respectively. A wire 43 for applying a voltage to the comb-shaped electrode 14 is provided between the comb-shaped electrode 14 and the relay circuit 41. A wire 53 for applying a voltage to each of the comb-shaped electrodes 15 is provided between the comb-shaped electrodes 15 and the relay circuit 51.

Further, a wire 44 for connecting the relay circuit 41 to the power supply circuit 61 is provided between the relay circuit 41 and the power supply circuit 61. A wire 54 for connecting the relay circuit 51 to the power supply circuit 61 is provided between the relay circuit 51 and the power supply circuit 61.

In Embodiment 3, the relay circuit 41 switches between application of a voltage to the allover electrode 12 and application of a voltage to the comb-shaped electrode 14. Similarly, the relay circuit 51 switches between application of a voltage to the allover electrode 22 and application of a voltage to each of the comb-shaped electrodes 15.

That is, the relay circuits 41 and 51, the power supply circuit 61, and the wires 42 through 44 and 52 through 54 serve as (i) an electric field application direction changing circuit which changes a direction of an electric field to be applied to the optical modulation layer 30 and (ii) a voltage applying section which selectively applies a voltage to the allover electrodes 12 and 22 and the comb-shaped electrodes 14 and 15. Further, the relay circuit 41 serves as a switching circuit (selection circuit) that selects one of the allover electrode 12 and the comb-shaped electrode 14 to which one a voltage is to be applied (switches between application of a voltage to the allover electrode 12 and application of a voltage to the comb-shaped electrode 14). Similarly, the relay circuit 51 serves as a switching circuit (selection circuit) that selects one of the allover electrode 22 and the comb-shaped electrodes 15 to which one a voltage is to be applied (switches between application of a voltage to the allover electrode 22 and application of a voltage to each of the comb-shaped electrodes 15).

For example, as illustrated in (a) of FIG. 20, by (i) switching the relay circuit 41 so that the power supply circuit 61 is connected to the allover electrode 12 and (ii) switching the relay circuit 51 so that the power supply circuit 61 is connected to the allover electrode 22, a vertical electric field perpendicular to the substrates 10e and 20 is applied to the optical modulation layer 30.

On the other hand, as illustrated in (b) of FIG. 20, by (i) switching the relay circuit 41 so that the power supply circuit 61 is connected to the comb-shaped electrode 14 and (ii) switching the relay circuit 51 so that the power supply circuit 61 is connected to the comb-shaped electrodes 15, a horizontal electric field in parallel to the substrates 10e and 20 is applied to the optical modulation layer 30.

Each of the relay circuits 41 and 51 can be alternatively switched, for example, in response to a switching signal supplied from a signal source (not illustrated), the switching signal switching an electrode to which a voltage is to be applied. Alternatively, each of the relay circuits 41 and 51 can manually switched.

(How to Control Transmittance)

Next, the following description will discuss, in detail, (i) how the optical modulation layer 30 controls its transmittance with respect to light and (ii) how the display panel 2e carries out display. Note that the following description will take, as an example, a case where flake-shaped shape anisotropy members (hereinafter, merely referred to as "flakes") are employed as the shape anisotropy members 32.

(a) of FIG. 22 is a cross-sectional view of a main part of the display panel 2e illustrated in (a) of FIG. 20, which view illustrates how light travels. (b) of FIG. 22 is a cross-sectional view of a main part of the display panel 2e illustrated in (b) of FIG. 20, which view illustrates how light travels. Note that (a) and (b) of FIG. 22 do not illustrate the relay circuits 41 and 51 and the power supply circuit 61. Note also that (b) of FIG. 20 and (b) of FIG. 22 illustrates, as an example, a state where the flakes are oriented so as to adhere to the substrate 10e.

According to Embodiment 3, each direction of the shape anisotropy members 32 is reversibly switched by reversibly switching between (i) the vertical electric field generated between the allover electrodes 12 and 22 and (ii) the horizontal electric field generated between the comb-shaped electrodes 14 and 15 as described above.

For example, in a case where an alternating voltage is applied between the uniform allover electrodes 12 and 22 which face each other, the flakes rotate so that each long axis of the flakes is in parallel to an electric flux line (see (a) of FIG. 20). That is, the flakes are oriented (vertically oriented) so that each long axis of the flakes is perpendicular to the substrates 10e and 20. This causes light that enters the optical modulation layer 30 from the backlight 3 to be transmitted by (passes through) the optical modulation layer 30 and then exit to the viewer side (see (a) of FIG. 22).

On the other hand, in a case where an alternating voltage of a given value or more is applied to each of the comb-shaped electrodes 14 and 15 which are provided on an identical plane surface so as to alternate each other, the flakes are oriented (horizontally oriented) in a vicinity between the comb-shaped electrodes 14 and 15 so as to adhere to the substrate 10e (see (b) of FIG. 20).

In a case where the flakes are thus horizontally oriented, reflecting surfaces of the flakes are oriented in parallel to the substrate 10e. Therefore, entering light is reflected by the reflecting surfaces and is not transmitted to an opposite side of where the light has entered. This cause light that enters the optical modulation layer 30 from the backlight 3 to be blocked by the flakes horizontally oriented.

Note that a degree at which the flakes are oriented can be controlled by controlling a level of an applied voltage. At least part of light that enters the optical modulation layer 30 from the backlight 3 is blocked by the flakes, depending on the level of the applied voltage. This allows a change in transmittance (amount of transmitted light) with respect to light that enters the optical modulation layer 30 from the backlight 3.

Note that voltages to be applied between the allover electrodes 12 and 22 and between the comb-shaped electrodes 14 and 15 can be set so as to individually have the most suitable values, in a case where the flakes are switched from vertical orientation to horizontal orientation.

However, simply by changing an electrode to which a voltage is to be applied, that is, by switching to application of a voltage between the comb-shaped electrodes 14 and 15, with the use of relay circuits, while a voltage, having a given value equal to or more than a threshold with which the flakes are horizontally oriented, is being applied between the allover electrodes 12 and 22 from the power supply circuit 61, it is possible to switch the flakes from the vertical orientation to the horizontal orientation.

According to Embodiment 3, the uniform allover electrodes 12 and 22, which face each other, are provided on the pair of substrates 10 and 20, respectively, which face each other. Therefore, in a case where a voltage is applied between the allover electrodes 12 and 22, the flakes are vertically oriented due to a uniform vertical electric field. Alternatively, by applying a voltage between the comb-shapes electrodes 14 and 15, the flakes are completely horizontally oriented.

According to Embodiment 3, it is possible to apply a horizontal electric field to the optical modulation layer 30 with the use of the comb-shaped electrodes. This allows orientation of the flakes to be three-dimensionally controlled so that each surface of the flakes is in parallel to the substrates (so that each short axis of the flakes is perpendicular to the substrates). Furthermore, an entire periphery of a core, which is an electric conductor, of each of the shape anisotropy members 32 is covered by a covering layer which is a dielectric. This does not causes leakage between the comb-shaped electrodes 14 and 15.

Therefore, according to Embodiment 3, it is possible to provide a display panel 2e and a display device 1e each of which does not require a polarizing plate and which is simple in configuration and high in contrast and light use efficiency.

(Variation of Allover Electrode)

Note that Embodiment 3 has described, as an example, a case where the allover electrodes 12 is formed on the insulating substrate 11 so as to extend over the almost entire surface of the insulating substrate 11 which surface faces the substrate 20.

However, allover electrodes 12 can be alternatively provided so as to correspond to the respective plurality of pixels. In this case, each of the allover electrodes 12 is connected to a switching element, such as a TFT, other than the switching element to which the comb-shaped electrode 14 is connected. A signal which varies depending on a video signal is supplied to the allover electrodes 12.

Thus, it is only necessary that, in a case where the display device 1e has a plurality of display regions (pixel regions), the allover electrodes 12 be formed all over in the respective display regions (respective pixel regions).

[Embodiment 4]

The following description will discuss further another embodiment. Note that, for convenience, identical reference numerals are given to respective members and configurations having functions identical to those described with reference to the drawings in Embodiment 1, and the members and configurations will not be described here.

(Configuration of Display Device)

FIG. 23 is a cross-sectional view schematically illustrating a configuration of a display device 1f in accordance with Embodiment 4. The display device 1f includes a display panel 2f, a backlight 3 provided so as to face the display panel 2f, and a driving circuit (not illustrated).

The display device 1f is a transmissive display device which carries out display by causing the display panel 2f to transmit light emitted from the backlight 3.

The display panel 2f includes (i) a pair of substrates 10f and 20f which are provided so as to face each other and (ii) an optical modulation layer 30f which is provided between the pair of substrates 10f and 20f. The substrate 10f (first substrate) is provided on a backlight 3 side (back surface side), and the substrate 20f (second substrate) is provided on a display surface side (viewer side). Further, the display panel 2f has a plurality of pixels arranged in a matrix manner.

(Configurations of Substrates)

The substrate 10f includes a transparent glass substrate 11 serving as an insulating substrate, electrodes 12, and an alignment film 17. The glass substrate 11, the electrodes 12, and the alignment film 17 are layered in this order.

The substrate 20f includes a transparent glass substrate 21 serving as an insulating substrate, an electrode 22, and an alignment film 25. The glass substrate 21, the electrode 22, and the alignment film 25 are layered in this order.

The substrates 10f and 20f are provided so that a surface of the substrate 10f, on which surface the alignment film 17 is provided, faces, via the optical modulation layer 30f, a surface of the substrate 20f, on which surface the alignment film 25 is provided.

The substrate 10f constitutes an active matrix substrate. Specifically, the substrate 10f includes the glass substrate 11, on which various signal lines (such as scanning signal lines and data signal lines) (not illustrated), thin film transistors (TFTs) (not illustrated), and an insulating film (not illustrated) are provided. The electrodes 12 (pixel electrode) are provided on those member.

The alignment film 17 provided on the substrate 10f and the alignment film 25 provided on the substrate 20f are each subjected to alignment treatment so that liquid crystal molecules contained in the optical modulation layer 30f are aligned so as to be twisted (later described). Specifically, a method can be, for example, employed in which a polyimide film having a thickness of 800 Å is formed and then subjected to rubbing. However, Embodiment 4 is not limited to such a method, and any known method can be employed.

Note that the alignment treatment is preferably carried out so that, while no voltage is being applied to the optical modulation layer 30f, the liquid crystal molecules are aligned, from the substrate 10f toward the substrate 20f, at a twist angle of not less than 90 degrees and not more than 3600 degrees.

(Configuration of Optical Modulation Layer)

The optical modulation layer 30f includes (i) a liquid crystal material 31f (medium) made up of a plurality of liquid crystal molecules and (ii) shape anisotropy members 32.

The optical modulation layer 30f is configured such that a voltage is applied to the optical modulation layer 30f by a power supply 33 connected to the electrodes 12 and the electrode 22. Depending on a change in such an applied voltage, the optical modulation layer 30f changes its transmittance with respect to light that enters the optical modulation layer 30f from the backlight 3.

As the liquid crystal material 31f, one that is aligned so as to be twisted between the substrates 10 and 20 is employed. For example, chiral nematic liquid crystal can be employed which is obtained by adding a chiral agent to nematic liquid crystal and then mixing them together. A concentration of the chiral agent is determined depending on a type of the chiral agent or a type of the nematic liquid crystal, and is adjusted so that (i) an alignment direction (rubbing direction) of the alignment film 17 is displaced, by 90 degrees, from that of the alignment film 25 and (ii) a chiral pitch is 70 μm in a case of a panel in which the optical modulation layer 30f has a thickness (cell thickness) of 45 μm.

As the nematic liquid crystal, positive (P-type) liquid crystal having a positive dielectric constant anisotropy can be employed. Alternatively, negative (N-type) liquid crystal having a negative dielectric constant anisotropy can be employed. Note that a case where the P-type liquid crystal is employed will be described below, unless otherwise specified.

Each of the shape anisotropy members 32 includes (i) a core made of an electric conductor such as metal and (ii) a covering layer. The shape anisotropy members 32 are only necessary to (i) be each a member that responds by rotating depending on a direction of an electric field and (ii) be arranged such that the liquid crystal is aligned on/above surfaces of the shape anisotropy members 32 so as to be in parallel to the surfaces. Note that the term "parallel" does not mean that the liquid crystal is strictly in parallel to the surfaces of the shape anisotropy members 32. The liquid crystal can be substantially in parallel to the surfaces of the shape anisotropy members 32.

In order that the liquid crystal molecules are aligned on/above the surfaces of the shape anisotropy members 32 so as to be in parallel to the surfaces, resin can be, for example, employed as the covering layer. Note that each of the shape anisotropy members 32 does not need to have an electrostatic property, unlike those described in Embodiment 1.

(How to Control Transmittance)

Next, how the optical modulation layer 30f controls its transmittance with respect to light will be described below. Note that a case will be described below where flakes are employed as the shape anisotropy members 32.

FIG. 23 is a cross-sectional view of the display device 1f, which carries out transmissive display. (a) of FIG. 23 illustrates a state where a small amount of light is transmitted by the display device 1f. (b) of FIG. 23 illustrates a state where a large amount of light is transmitted by the display device 1f.

By aligning (horizontally aligning) the flakes so that each longitudinal direction of the flakes is in parallel to the substrates 10f and 20f, light is blocked (see (a) of FIG. 23). In a case where the flakes are thus horizontally aligned, reflecting surfaces (surfaces perpendicular to short axes) of the flakes are aligned in parallel to the substrates 10f and 20f, so that entering light is reflected by the reflecting surfaces and is not transmitted to an opposite side of where the light has entered.

On the other hand, by aligning (vertically aligning) the flakes so that each long axis of the flakes is perpendicular to surfaces of the substrates 10f and 20f, light is transmitted (see (b) of FIG. 23).

Note here that the phrase "entering light is transmitted" means that (i) entering light is directly transmitted and (ii) entering light is reflected by the reflecting surfaces of the flakes and then transmitted to the surface of the substrate opposite to that the light has entered.

In this case, in a case where the backlight is provided on the back surface side, it is possible to carry out such transmissive display that is carried out by a liquid crystal display.

(How to Control Alignment of Shape Anisotropy Members)

Next, how to control alignment of the flakes will be described in detail with reference to FIG. 24. FIG. 24 illustrates how (i) the flakes, serving as shape anisotropy members 32, and (ii) part of the liquid crystal molecules 36, contained in the liquid crystal material 31f, are aligned.

Note that, in planar view, an angle made by the alignment direction of the alignment film 25 and the alignment direction of the alignment film 17 is 180 degrees. Therefore, while no voltage is being applied to the optical modulation layer 30f, the liquid crystal molecules 36 are arranged so that the liquid crystal molecules 36 are helically twisted in a direction normal to the surfaces of the substrates 10f and 20f and, accordingly, long axis directions of the liquid crystal molecules 36, which is apart from each other by a given distance at least in the direction normal to the surfaces of the substrates 10f and 20f, are different from each other.

Note also that, as the liquid crystal material 31f, the P-type liquid crystal is employed.

(a) of FIG. 24 illustrates how the flakes and the liquid crystal molecules 36 are aligned while no voltage is being applied to the optical modulation layer 30f. (b) and (c) of FIG. 24 each illustrate how the flakes and the liquid crystal molecules 36 are aligned while a voltage is being applied to the optical modulation layer 30f.

Note that the voltage applied to the optical modulation layer 30f illustrated in (b) of FIG. 24 is controlled, by a driving circuit (not illustrated), so as to be smaller than that applied to the optical modulation layer 30f illustrated in (c) of FIG. 24.

As illustrated in (a) of FIG. 24, while no voltage is being applied to the optical modulation layer 30f, the liquid crystal molecules 36 are aligned so that, in accordance with the alignment directions of the alignment films 17 and 25, a helical axis of the liquid crystal molecules 36 is perpendicular to the surfaces of the substrates 10f and 20f. In other words, the liquid crystal molecules 36 are aligned so as to be twisted at 180 degrees between the substrates 10f and 20f.

Further, as a result of movement of the flakes in such a way that the liquid crystal molecules 36 are aligned in parallel to surfaces (surfaces perpendicular to respective short axes) of the flakes, the flakes are aligned so that the surfaces of the flakes are in parallel to the surfaces of the substrates (so that the short axes of the flakes are perpendicular to the surfaces of the substrates). That is, the flakes are horizontally aligned.

Note here that the liquid crystal molecules 36 are aligned so as to be twisted. Therefore, an alignment direction of a liquid crystal molecule 36 on one surface of a flake is slightly different from that of a liquid crystal molecule 36 on the other surface of the flake. This causes the flake to be supported from two directions (two axes) by the liquid crystal molecule 36 on the one surface of the flake and the liquid crystal molecule 36 on the other surface of the flake. This ultimately causes the flake to (i) be secured by a restraining force from the liquid crystal molecules 36 and (ii) be horizontally aligned.

As illustrated in (b) of FIG. 24, in a case where a voltage (alternating voltage) is applied to the optical modulation layer 30f, an angle made by each of longitudinal directions of the liquid crystal molecules 36 and each of the surfaces of the substrates 10f and 20f becomes greater, depending on the voltage applied to the optical modulation layer 30f, in a state where the voltage is applied to the optical modulation layer 30f.

The flakes rotate so that each long axis of the flakes becomes in parallel to an electric flux line, and are ultimately vertically aligned, due to a force explained from the viewpoint of a dielectrophoretic phenomenon, the Coulomb force, or electric energy and a force minimizing interfacial energy between the flakes and the liquid crystal.

This causes a change in alignment of the flakes and, accordingly, causes a change in angle made by (i) a normal (short axis) with respect to a surface, having the largest area, of each of the flakes and (ii) a normal with respect to the surfaces of the substrates 10f and 20f.

As illustrated in (c) of FIG. 24, in a case where a voltage applied to the optical modulation layer 30f is equal to or more than a threshold, the liquid crystal molecules 36 are aligned so that each long axis of the liquid crystal molecules 36 is perpendicular to the surfaces of the substrates 10f and 20f.

This causes the normal with respect to the surface, having the largest area, of each of the flakes to be perpendicular to the normal with respect to the surfaces of the substrates 10f and 20f.

In a case where the P-type liquid crystal is employed as the liquid crystal material 31f, inclination of the liquid crystal molecules 36 with respect to the surfaces of the substrates 10f and 20f is in an intermediate state (see (b) of FIG. 24) depending on a level of a voltage applied to the optical modulation layer 30f. Therefore, inclination of the flakes with respect to the surfaces of the substrates 10f and 20f is also in an intermediate state.

This allows light to be transmitted in an amount which varies depending on a level of a voltage applied to the optical modulation layer and, accordingly, allows the display device 1f to easily carry out halftone display.

As has been described, by changing a level of a voltage to be applied to the optical modulation layer 30f, it is possible to reversibly control the alignment of the flakes (it is possible to switch the alignment of the flakes).

As has been described, in a case where the P-type liquid crystal is employed, the liquid crystal molecules 36 are homeotropically aligned while a voltage is being applied to the optical modulation layer 30f. Accordingly, the restraining force causing the flakes to be horizontally aligned disappears, so that it is possible for the flakes to rotate so as to be vertically aligned.

In a case where the N-type liquid crystal is employed as the liquid crystal material 31f, the liquid crystal molecules 36 are aligned so that each long axis direction of the liquid crystal molecules 36 is in parallel to the surfaces of the substrates, while no voltage is being applied to the optical modulation layer 30f. Therefore, the flakes are also horizontally aligned.

Even in a case where a voltage is applied to the optical modulation layer 30f, alignment of the liquid crystal molecules 36, each of which is N-type, is not changed. However, the alignment of the flakes is changed to the vertical alignment by a force which acts on the flakes and which is explained from the viewpoint of a dielectrophoretic phenomenon, the Coulomb force, or electric energy. In a case where such an applied voltage is then decreased in level, the flakes receive a restraining force depending on the alignment of the liquid crystal molecules 36. Accordingly, it is possible to immediately return the alignment of the flakes to the horizontal alignment.

Furthermore, in a case where the N-type liquid crystal is employed, a force, causing the flakes to be horizontally aligned, always acts due to the liquid crystal molecules 36, even while a voltage is being applied to the optical modulation layer 30f. Therefore, by balancing (i) rotary torque of each of the flakes, which rotary torque is caused by application of a voltage, with (ii) the restraining force, causing the horizontal alignment, from the liquid crystal molecules 36, it is possible to simply halftone display carried out by the display device 1f.

According to the display device 1f of Embodiment 4, it is possible to increase light use efficiency with a simple configuration. Furthermore, since alignment of the shape anisotropy members 32 is determined depending on whether or not a voltage is applied to the optical modulation layer 30f, it is possible to control rewrite of brightness at a switching speed which is fast in both directions.

The present invention is not limited to the description of the embodiments, but may be altered by a skilled person in the art within the scope of the claims. An embodiment obtained by a proper combination of technical means disclosed in different embodiments is also encompassed in the technical scope of the present invention.

INDUSTRIAL APPLICABILITY

The present invention is applicable to displays such as a display of a television set.

REFERENCE SIGNS LIST 1, 1a through 1f Display device
2, 2a through 2f Display panel
3 Backlight
10, 10a through 10f Substrate (first substrate, second substrate)
11 Glass substrate (insulating substrate)
12 Electrode (first electrode, pixel electrode)
13 Light absorbing layer
14, 15 Comb-shaped electrodes
14A, 15A Divergent electrodes
14B, 15B Main electrodes
14L, 15L Electrode sections
14S, 15S Space sections
15 Comb-shaped electrodes
16 Insulating layer
17, 25 Alignment film
20, 20f Substrate (second substrate, first substrate)
21 Glass substrate (insulating substrate)
22 Electrode (second electrode, common electrode)
24 Rib
30, 30a through 30f Optical modulation layer
31 Medium
31a Polar solvent
31b Non-polar solvent
31f Liquid crystal molecules (medium)
32, 32a Shape anisotropy member
33 Power supply
34 Core
35 Covering layer
36 Liquid crystal molecules
41, 51 Relay circuits
42 through 44, 52 through 54 Wire
61 Power supply circuit
101 Flake
102 Core
103 Polyester film

The invention claimed is:
1. A display panel comprising:
a first substrate facing a second substrate, wherein each of the first substrate and the second substrate includes at least one electrode; and
an optical modulation layer configured to control a transmittance with respect to light that enters the optical modulation layer, wherein the optical modulation layer is provided between the first substrate and the second substrate; and a plurality of shape anisotropy members, wherein
at least a portion of the plurality of shape anisotropy members is provided in the optical modulation layer; and
each of the plurality of shape anisotropy members includes (i) an electrically conductive core and (ii) a dielectric layer that covers an entire periphery of the core, and
wherein an area of each image of the plurality of shape anisotropy members is configured to change which image is projected on the first substrate and the second substrate based on a level or a frequency of a voltage to be applied to the optical modulation layer.

2. The display panel as set forth in claim 1, wherein:
the optical modulation layer includes a medium in which the plurality of shape anisotropy members are dispersed; and
a difference in refractive index between the medium and the covering layer is not more than 0.3.

3. The display panel as set forth in claim 2, wherein the difference in refractive index between the medium and the covering layer is not more than 0.2.

4. The display panel as set forth in claim 1, wherein the covering layer has a thickness of not less than 0.002 μm.

5. The display panel as set forth in claim 4, wherein the covering layer has a thickness of not less than 0.04 μm.

6. The display panel as set forth in claim 4, wherein the covering layer has a thickness of not less than 0.1 μm.

7. The display panel as set forth in claim 4, wherein, assuming that "n" represents a/the refractive index of the covering layer, the covering layer has a thickness of less than $0.19/n[\mu m]$.

8. The display panel as set forth in claim 1, wherein, assuming that "n" represents a/the refractive index of the covering layer, the covering layer has a thickness of more than $0.39/n[\mu m]$.

9. The display panel as set forth in claim 1, wherein at least part of the covering layer is made of silicon dioxide.

10. The display panel as set forth in claim 1, wherein the core is made of metal and has a reflectivity.

11. The display panel as set forth in claim 1, wherein:
each of the plurality of shape anisotropy members has an electrostatic property; and
in a case where the voltage applied to the optical modulation layer is a direct voltage or a voltage having a low frequency of not more than a first threshold, the optical modulation layer blocks light, whereas, in a case where the voltage applied to the optical modulation layer is a voltage having a high frequency of not less than second threshold, the optical modulation layer transmits light.

12. A display panel as set forth in claim 1, further comprising
an electric field application direction changing circuit configured to change a direction of an electric field applied to the optical modulation layer,
the first substrate includes an allover electrode as said at least one electrode,
the second substrate includes, as said at least one electrode, an allover electrode and at least one comb-shaped electrode being provided, via an insulating layer, on the allover electrode of the second substrate.

13. The display panel as set forth in claim 1, wherein:
the optical modulation layer contains a liquid crystal material comprising liquid crystal molecules;
each surface of the first substrate and the second substrate that faces the optical modulation layer is subjected to alignment treatment; and
the alignment treatment is carried out so that, while no voltage is being applied to the optical modulation layer, the liquid crystal molecules are aligned so as to be twisted from the first substrate toward the second substrate.

14. A display device comprising a display panel recited in claim 1.

15. A display panel comprising:
a first substrate facing a second substrate; and
an optical modulation layer configured to control a transmittance with respect to light that enters the optical modulation layer, wherein the optical modulation layer is provided between the first substrate and the second substrate, wherein:
the optical modulation layer contains a polar solvent and a non-polar solvent;
the first substrate has a hydrophilic property and is in contact with the polar solvent;
the second substrate has a hydrophobic property and is in contact with the non-polar solvent;
a plurality of shape anisotropy members, wherein
at least a portion of the plurality of shape anisotropy members is provided in the optical modulation layer;
each of the plurality of shape anisotropy members includes (i) an electrically conductive core and (ii) a dielectric layer that covers an entire periphery of the core, and
each of the plurality of shape anisotropy members has a hydrophilic property or a hydrophobic property; and
wherein an area of the each image of the plurality of shape anisotropy members is configured to change which image is projected on the first substrate and the second substrate based on a level or a frequency of a voltage to be applied to the optical modulation layer.

16. The display panel as set forth in claim 15, wherein:
the optical modulation layer includes a medium in which the plurality of shape anisotropy members are dispersed; and
a difference in refractive index between the medium and the covering layer is not more than 0.3.

17. The display panel as set forth in claim 15, wherein the covering layer has a thickness of not less than 0.002 μm.

18. The display panel as set forth in claim 15, wherein at least part of the covering layer is made of silicon dioxide.

19. The display panel as set forth in claim 15, wherein the core is made of metal and has a reflectivity.

20. A display device comprising a display panel recited in claim 15.

* * * * *